United States Patent
Oka et al.

(10) Patent No.: US 12,124,749 B2
(45) Date of Patent: Oct. 22, 2024

(54) IMAGE PROCESSING DEVICE HAVING A VPN PROCESSING UNIT THAT CONNECTS TO A VPN USING AUTHENTICATION INFORMATION OBTAINED THROUGH UI UNIT FOR ACQUIRING WORKFLOW USING TERMINAL ADDRESS, INFORMATION PROCESSING SYSTEM AND METHOD

(71) Applicant: KYOCERA Corporation, Kyoto (JP)

(72) Inventors: Hiroshi Oka, Kyoto (JP); Shigeki Takaya, Yokohama (JP); Hirofumi Suzuki, Koka (JP); Kouichi Maruta, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/546,974

(22) PCT Filed: Aug. 20, 2021

(86) PCT No.: PCT/JP2021/030627
§ 371 (c)(1),
(2) Date: Aug. 18, 2023

(87) PCT Pub. No.: WO2022/176238
PCT Pub. Date: Aug. 25, 2022

(65) Prior Publication Data
US 2024/0134582 A1  Apr. 25, 2024
US 2024/0231719 A9  Jul. 11, 2024

(51) Int. Cl.
G06F 3/12   (2006.01)
H04N 1/327  (2006.01)

(52) U.S. Cl.
CPC .......... *G06F 3/1236* (2013.01); *G06F 3/1222* (2013.01); *G06F 3/1285* (2013.01); *H04N 1/32747* (2013.01)

(58) Field of Classification Search
None
See application file for complete search history.

(56) References Cited

U.S. PATENT DOCUMENTS

| | | | |
|---|---|---|---|
| 2007/0220615 A1 | 9/2007 | Ogawa | |
| 2009/0161180 A1 | 6/2009 | Nakayama | |
| 2009/0235351 A1* | 9/2009 | Brown | H04W 12/03 726/15 |
| 2011/0260079 A1* | 10/2011 | Tokhtuev | G01N 21/8507 250/461.1 |

(Continued)

FOREIGN PATENT DOCUMENTS

| | | | |
|---|---|---|---|
| JP | 2003-140528 A | 5/2003 |
| JP | 2007-251906 A | 9/2007 |

(Continued)

*Primary Examiner* — Haris Sabah
(74) *Attorney, Agent, or Firm* — HAUPTMAN HAM, LLP

(57) ABSTRACT

An image processing device includes an image processing unit, a UI unit, a VPN processing unit, and a housing. The image processing unit includes a printer and/or a scanner. The UI unit is the target of an input action performed by the user. The VPN processing unit connects to a VPN using authentication information obtained through the UI unit. The image processing unit, the UT unit, and the VPN processing unit are provided to the housing.

19 Claims, 19 Drawing Sheets

(56) References Cited

U.S. PATENT DOCUMENTS

| | | | | |
|---|---|---|---|---|
| 2013/0100484 A1* | 4/2013 | Hankins | ............... | G06F 3/126 |
| | | | | 358/1.15 |
| 2014/0029750 A1 | 1/2014 | Wei et al. | | |
| 2014/0226173 A1* | 8/2014 | Tredoux | ............. | H04W 12/30 |
| | | | | 358/1.14 |
| 2016/0381277 A1* | 12/2016 | Satoh | ............... | H04L 12/4641 |
| | | | | 348/211.3 |

FOREIGN PATENT DOCUMENTS

| | | |
|---|---|---|
| JP | 2008-040963 A | 2/2008 |
| JP | 2009-166479 A | 7/2009 |
| JP | 2020-154802 A | 9/2020 |

\* cited by examiner

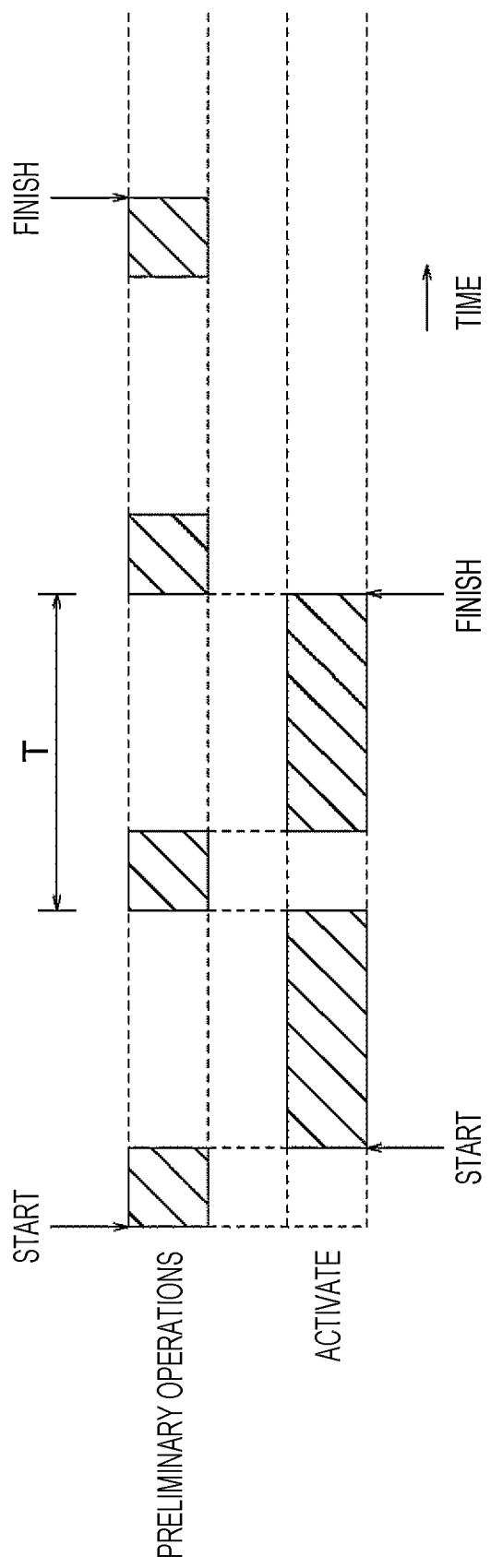

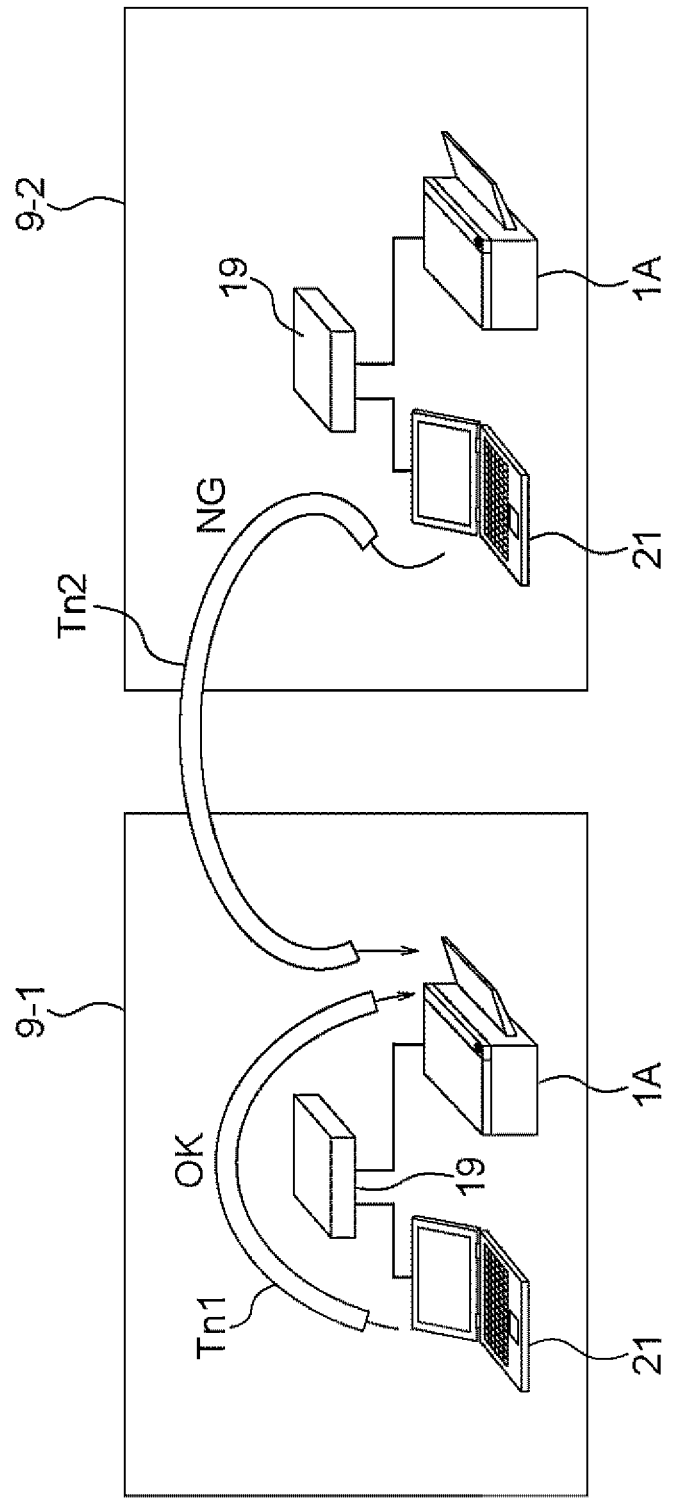

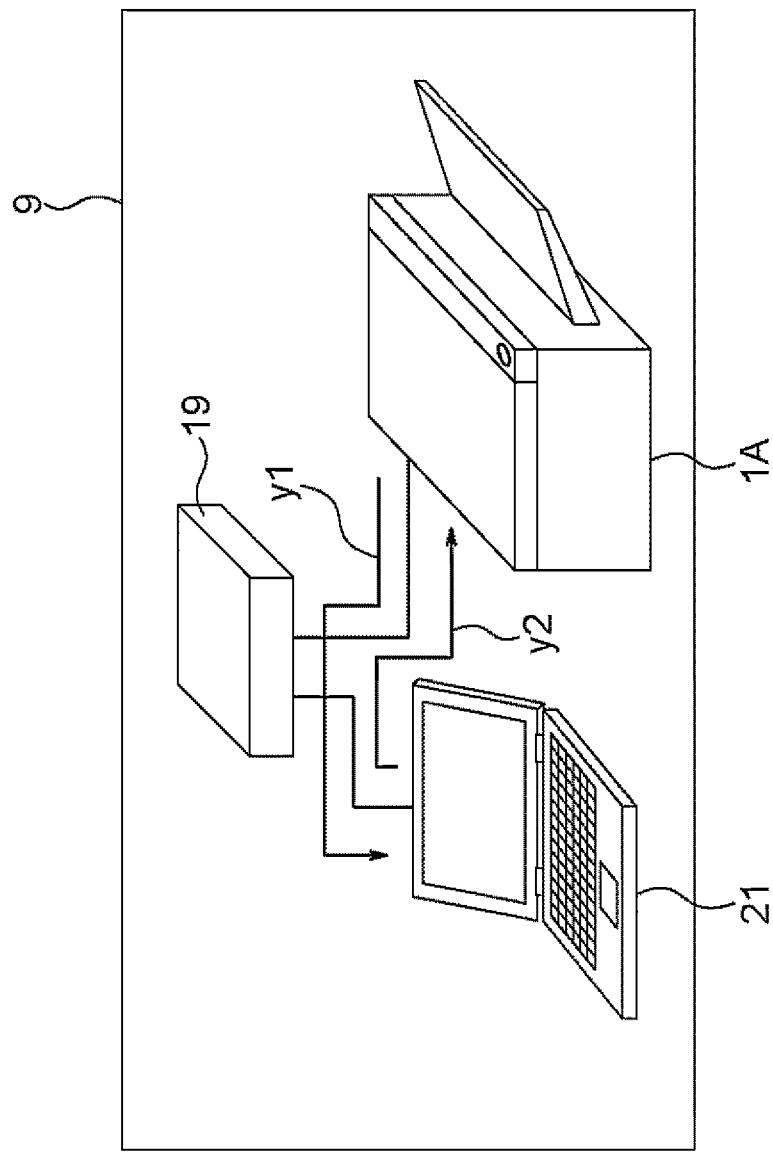

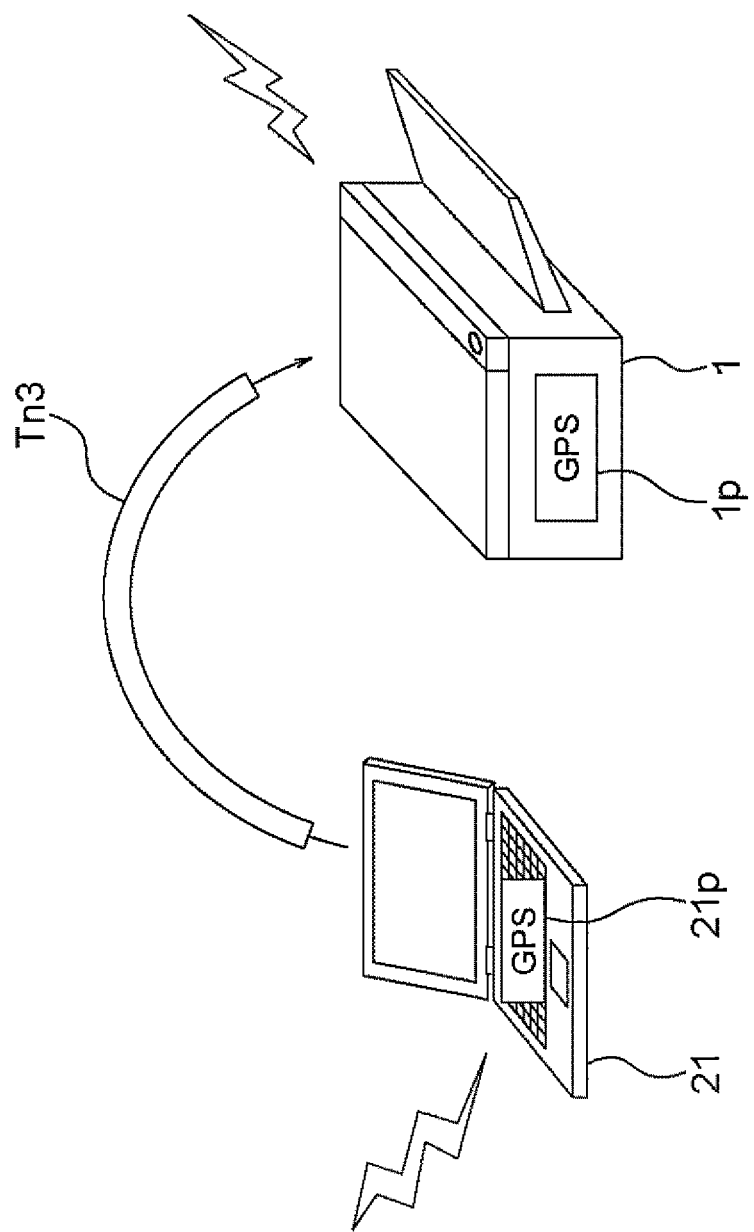

FIG. 18
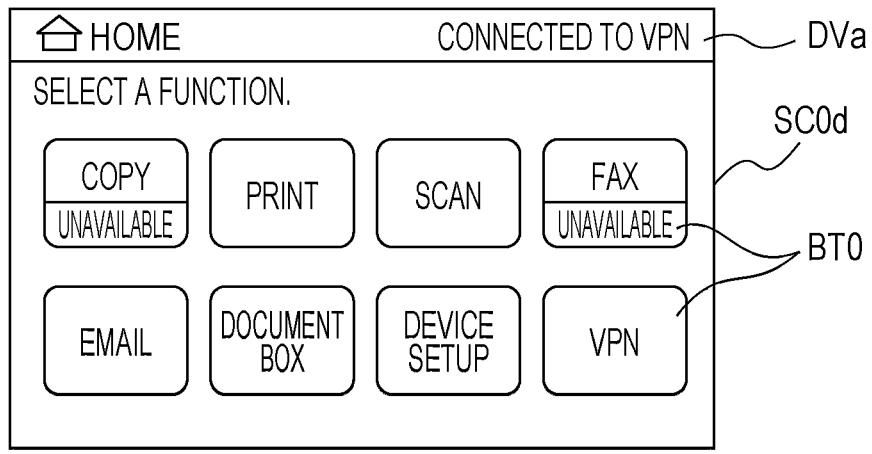
FIG. 19
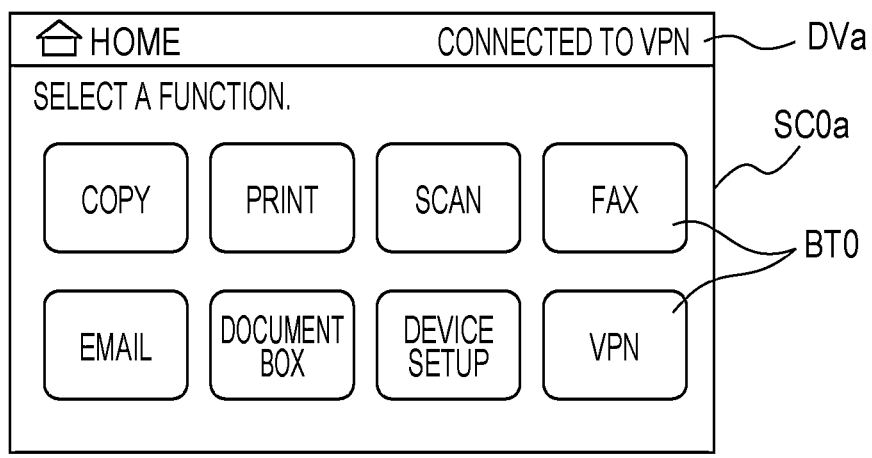
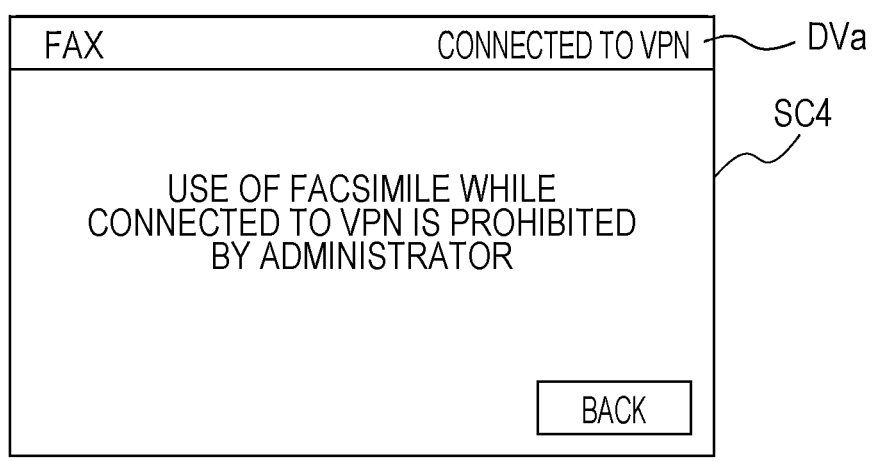

IMAGE PROCESSING DEVICE HAVING A VPN PROCESSING UNIT THAT CONNECTS TO A VPN USING AUTHENTICATION INFORMATION OBTAINED THROUGH UI UNIT FOR ACQUIRING WORKFLOW USING TERMINAL ADDRESS, INFORMATION PROCESSING SYSTEM AND METHOD

RELATED APPLICATIONS

The present application is a National Phase of International Application No. PCT/JP2021/030627 filed Aug. 20, 2021, which claims priority to International Application No. PCT/JP2021/006309, filed Feb. 19, 2021.

TECHNICAL FIELD

The present disclosure relates to an image processing device including a printer and/or a scanner.

BACKGROUND OF INVENTION

A virtual private network (VPN) is a known technology for virtually extending a private network over a public network (the Internet, for example). Patent Literature 1 below discloses a technology for connecting a multi-function device (image processing device) to a VPN. In the technology described in Patent Literature 1, a mobile terminal stores information necessary to connect to a server on a VPN. The multi-function device communicates with the mobile terminal, obtains the information, and uses the obtained information to establish a connection with the server on the VPN.

CITATION LIST

Patent Literature

Patent Literature 1: Japanese Unexamined Patent Application Publication No. 2008-40963

SUMMARY

In an embodiment of the present disclosure, an image processing device includes an image processing unit, a user interface (UI) unit, a VPN processing unit, and a housing. The image processing unit includes a printer and/or a scanner. The UI unit is the target of an input action performed by a user. The VPN processing unit connects to a VPN using authentication information obtained through the UI unit. The image processing unit, the UI unit, and the VPN processing unit are provided to the housing.

BRIEF DESCRIPTION OF THE DRAWINGS

FIG. 8 is a schematic timing chart for explaining a situation in which a preliminary operation and activation of a VPN processing unit are performed in parallel.

FIG. 9A is a schematic diagram for explaining an aspect in which an image processing device prints selectively.

FIG. 9B is a schematic diagram illustrating an example of communication that does not establish a connection.

FIG. 9C is a schematic diagram illustrating an example aspect in which printing is performed when an image processing device and a terminal satisfy a prescribed positional relationship.

FIG. 18 is a diagram illustrating another example of a screen when functionality is restricted.

FIG. 19 is a diagram illustrating yet another example of screens when functionality is restricted.

DESCRIPTION OF EMBODIMENTS

Hereinafter, an embodiment will be described with reference to the drawings. Namely, an image processing device will be described. Note that some terms are generally polysemous, as indicated below. In the description of the present embodiment, the meanings of terms likewise are to be interpreted appropriately in context.

The term VPN may refer to a technology to virtually extend a private network over a public network, or to a network set up by this technology. Note that the term VPN may be prepended or appended to technical features related to a VPN where appropriate. For example, a connection established to communicate using a VPN may be referred to as a VPN connection, and the establishment of such a connection may be referred to as VPN-connecting.

The term network may refer to a communication network, or to a communication network and a combination of devices connected thereto. The same applies to terms for subordinate concepts of a network. Terms for subordinate concepts of a network are, for example, Internet, public network, private network, local area network (LAN), and VPN.

The term connection may refer to a connection (connection in the narrow sense) established through authentication (a three-way handshake, for example), or to a connection that simply means that communication is possible (connection in the broad sense). The following are examples of connections which are unlike the former but included in the latter. A connection in which communication is possible before a connection is established (for example, a broadcast and a reply thereto), but the establishment of a connection is disallowed. Devices which are electrically (or, from a different perspective, physically) connected to one another by cables, but in which communication is strictly disallowed by software (or, from a different perspective, logically).

(Overview of Overall Configuration of Communication System)

Figure 1:
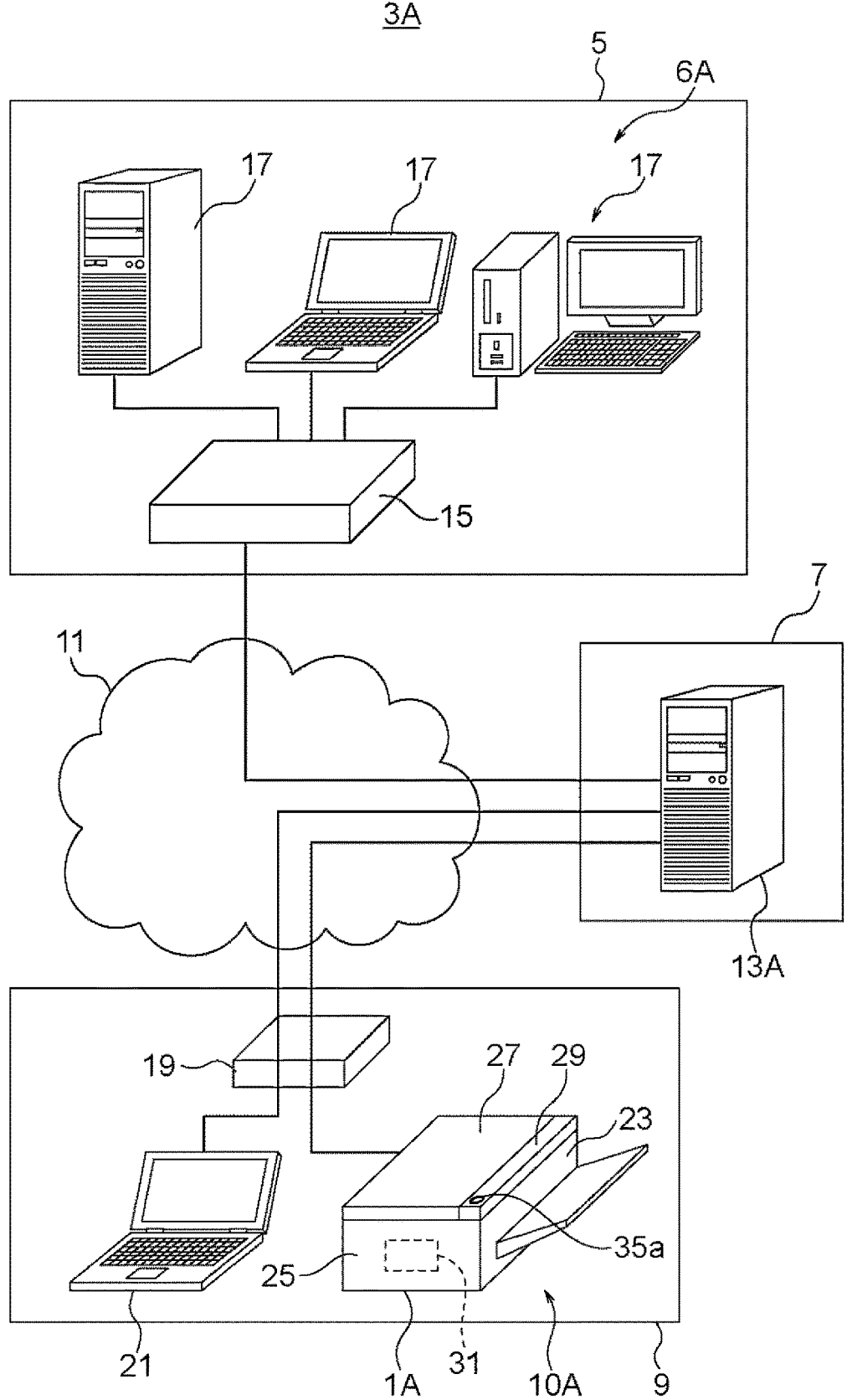
FIG. 1 is a schematic diagram illustrating an example of a communication system including an image processing device according to an embodiment.
Figure 2:
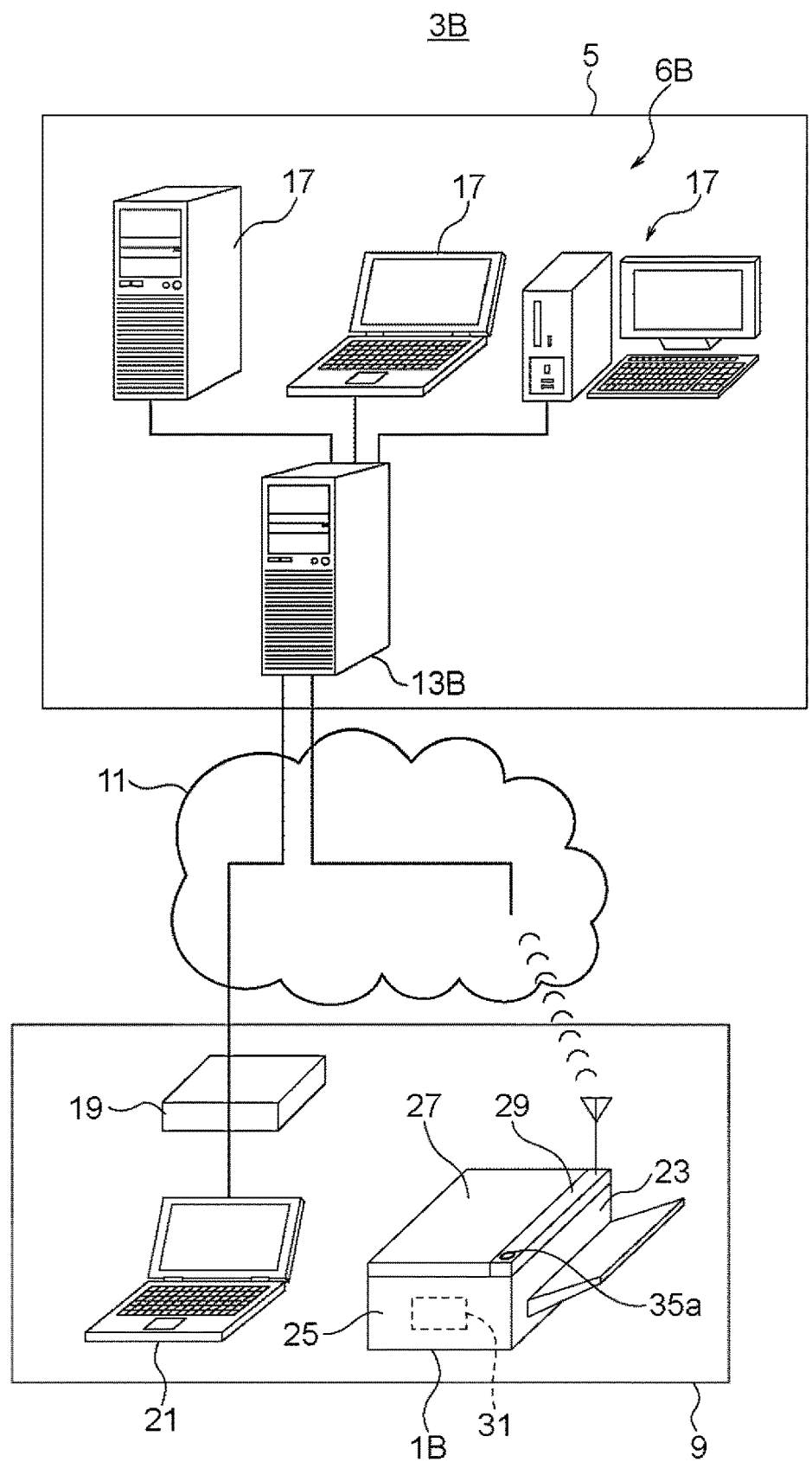
FIG. 2 is a schematic diagram illustrating another example of a communication system including an image processing device according to an embodiment.

FIG. 1 is a schematic diagram illustrating a communication system 3A including an image processing device 1A according to an embodiment. FIG. 2 is a schematic diagram illustrating a communication system 3B including an image processing device 1B according to an embodiment. Hereinafter, the image processing devices 1A and 1B may be collectively referred to as the image processing device 1 (reference sign in FIG. 3 and the like).

The image processing device 1 includes a printer (printing unit) and/or a scanner (scanning unit). Note that the printer and/or scanner may be referred to as an image processing unit. The description of the present embodiment mainly takes the example of an aspect in which the image processing device 1 includes both a printer and a scanner. The image processing device 1 can communicate as a client of a remote access VPN, for example. A variety of configurations are possible for a communication system (or, from a different perspective, a network) including such an image processing device 1. The communication systems 3A and 3B are illustrated as representatives of the variety of configurations for such a communication system.

An overview of the communication system 3A illustrated in FIG. 1 is as follows.

The communication system 3A includes one or more electronic devices located in a company 5, one or more electronic devices located in a service company 7, and one or more electronic devices located in a home 9 of an employee of the company 5. The one or more electronic devices in each of the company 5, the service company 7, and the home 9 can communicate with a public network 11. The one or more electronic devices located in the service company 7 include a VPN server 13A that provides a VPN-related service. The one or more electronic devices located in the home 9 include the image processing device 1A.

The image processing device 1A communicates using a VPN with another electronic device in the home 9 and/or an electronic device in the company 5 (hereinafter designated the communication peer in this paragraph) through the VPN server 13A. In other words, data transmitted and received between the image processing device 1A and the communication peer passes through the VPN server 13A. A technology (described later) for enhancing VPN-related secrecy is used in the communication between the image processing device 1A and the VPN server 13A and in the communication between the communication peer (more precisely, a router 15 described later) and the VPN server 13A. Thus, the communication line between the image processing device 1A and the communication peer is logically isolated from an electronic device of a third party on the public network 11, and serves as a virtual exclusive line. That is, a VPN extending a private network is set up, and the image processing device 1A and the communication peer communicate through the VPN.

An overview of the communication system 3B illustrated in FIG. 2 is as follows.

Simply put, the communication system 3B has the configuration of the communication system 3A with the electronic device of the service company 7 omitted. The one or more electronic devices located in the company 5 include a VPN server 13B corresponding to the VPN server 13A of the service company 7. The one or more electronic devices located in the home 9 include the image processing device 1B.

The image processing device 1B communicates using a VPN with another electronic device in the home 9 and/or an electronic device other than the VPN server 13B in the company 5 (hereinafter designated the communication peer in this paragraph) through the VPN server 13B. In other words, data transmitted and received between the image processing device 1B and the communication peer passes through the VPN server 13B. A technology for enhancing VPN-related secrecy is used in the communication between the image processing device 1B and the VPN server 13B. The communication between the communication peer and the VPN server 13B (communication within the company 5) is the same as, and/or similar to, communication on a private network and/or LAN, for example. With the technology for enhancing VPN-related secrecy, the communication line between the image processing device 1B and the communication peer is logically isolated from an electronic device of a third party on the public network 11, and serves as a virtual exclusive line. That is, a VPN extending a private network is set up, and the image processing device 1B and the communication peer communicate through the VPN.

As above, the image processing device 1 can communicate using a VPN with another electronic device in the home 9 and/or an electronic device in the company 5. Consequently, for example, the image processing device 1 can receive and print a print job from another electronic device in the home 9 and/or an electronic device in the company 5 in a secure environment. As another example, the image processing device 1 can transmit image data obtained by scanning to another electronic device in the home 9 and/or an electronic device in the company 5 in a secure environment.

Note that the communication systems 3A and 3B may be defined to include the entire configuration illustrated or the portion of the configuration illustrated excluding the public network 11.

(Overview of Components of Communication System)

A network 6A (FIG. 1) or a network 6B (FIG. 2) is set up in the company 5. The networks 6A and 6B are each a private network and/or LAN. The company 5 may be considered an example of a location and/or organization where the network 6A or 6B is set up. Examples of locations and/or organizations other than the company 5 include public institutions (for example, government offices and schools), different companies from the company 5 (for example, a company that provides a certain service), and personal buildings (other than the home 9 illustrated). However, the description of the present embodiment mainly takes the example of the company 5 out of convenience.

The network 6A or 6B may have any of various configurations, and may be a known configuration or an application of a known configuration. The network 6A includes a router 15 and a plurality of in-house equipment 17 connected to the router 15. The network 6B includes the VPN server 13B and a plurality of in-house equipment 17 connected to the VPN server 13B. Note that the network 6B may include the VPN server 13B that doubles as the router, or a router, not illustrated, which is separate from the VPN server 13B. The in-house equipment 17 may be any of various types of equipment, such as a server (for example, a file server for sharing data), a personal computer (PC), or an image processing device (or, from a different perspective, a printer or scanner), for example. In FIGS. 1 and 2, a server, a desktop PC, and a laptop PC are illustrated as an example.

The router 15 in FIG. 1 has specific functionality related to a VPN, for example. Operations directly related to a VPN (for example, authentication, tunneling, and encryption) are performed between the router 15 and the VPN server 13A. In FIG. 2, operations directly related to a VPN are performed between the VPN server 13B and an electronic device in the home 9. That is, the in-house equipment 17 on the networks 6A and 6B do not perform operations directly related to a VPN, and basically communicate in the same and/or similar manner to communication by an electronic device on a private network, for example. However, the networks 6A and 6B may also include in-house equipment 17 that performs operations directly related to a VPN.

The VPN server 13A is provided in the service company 7. Note that, although not illustrated in particular, a private network and/or LAN, including the VPN server 13A, may also be set up in the service company 7. The VPN server 13A or a network including the VPN server 13A may have any of various configurations, and may be a known configuration or an application of a known configuration, for example.

Besides the image processing device 1, a terminal 21, for example, is provided in the home 9. The terminal 21 is a PC (of the desktop, laptop, or tablet type) or a smartphone, for example. The home 9 may be considered an example of a location and/or organization where the terminal 21 and the image processing device 1 are located at a relatively close distance to each other, or as an example of a location and/or organization where an electronic device to be used as a client of a remote access VPN is located. Examples of locations and/or organizations other than the home 9 include a small-scale branch or sales office of the company 5, for example. However, the description of the present embodiment mainly takes the example of the home 9 out of convenience.

The relationship between a location and/or organization (or, from a different perspective, social standing) and the division of technical roles in communication may differ from the description of the present embodiment. For example, the networks 6A and 6B may be set up in a data center in a branch of the company 5, and the in-house equipment 17 located in the company 5 may each function as a client of a remote access VPN, like the terminal 21 or the image processing device 1 in the home 9.

Unlike the in-house equipment 17 in the company 5, the terminal 21 and the image processing device 1 perform operations directly related to a VPN (for example, authentication, tunneling, and encryption) with respect to the VPN server 13A or 13B. In other words, a router 19 described later in the home 9 is a general router that does not perform operations directly related to a VPN. However, the router 19 in FIG. 2 may also perform operations directly related to a VPN in the same and/or similar manner to the router 15 in the company 5. That is, the terminal 21 in FIG. 2 is not required to perform operations directly related to a VPN.

The public network 11 may be set up to include the Internet, for example. In other words, the VPN in the communication systems 3A and 3B may be an Internet VPN. The public network 11 may also be set up to include a closed network provided by a telecommunications carrier or the like. In other words, the VPN in the communication systems 3A and 3B may be an Internet Protocol VPN (IP-VPN), an entry VPN, or wide area Ethernet. The public network 11 may also include the public telephone network.

(Configuration Related to Communication in Home)

The configuration and the like related to communication between the electronic devices (for example, the terminal 21 and the image processing device 1) located in the home 9 and the public network 11 may have any of various configurations. Examples are given below.

A router 19 may be provided in the home 9. In the example in FIG. 1, the terminal 21 and the image processing device 1A are both capable of communicating with the public network 11 through the router 19. In the example in FIG. 2, the terminal 21 is capable of communicating with the public network 11 through the router 19. On the other hand, the image processing device 1B is capable of communicating with the public network 11 without going through the router 19 (or, from a different perspective, separately from the terminal 21 and the router 19).

In the home 9 of the example in FIG. 1, the terminal 21 and the image processing device 1A are both connected to the router 19. In this case, a network 10A including the terminal 21 and the image processing device 1A may be considered to be set up. The network 10A is a private network and/or LAN, for example. Communication between the terminal 21 and the image processing device 1A through the network 10A is disallowed by functionality of the router 19, the terminal 21, and/or the image processing device 1A, for example. However, communication that does not establish a connection (for example, a broadcast and a reply thereto) may be performed.

In the home 9 of the example in FIG. 2, the image processing device 1B is not physically connected to the router 19, and by extension, a private network and/or LAN including the image processing device 1B is not set up. However, a private network and/or LAN may also be set up without going through the router 19, such as by allowing direct wired or wireless communication between the terminal 21 and the image processing device 1B. Communication using this network may be restricted to communication that does not establish a connection, for example.

In the image processing device 1, the configuration other than that related to a VPN may be the same as, and/or similar to, a known configuration, or may be a novel configuration. Communication between the image processing device 1A and the router 19 in FIG. 1 may be wired or wireless. Communication between the image processing device 1B and the public network 11 in FIG. 2 may be wired or wireless. Note that FIG. 2 illustrates an example of an aspect in which wireless communication takes place.

The image processing device 1B in FIG. 2 may communicate with the public network 11 in any of various ways. For example, the image processing device 1B may have a built-in router and communicate with the public network 11 through the router. The image processing device 1B may also communicate with the public network 11 through a router, not illustrated, provided in the home 9 separately from the router 19. The image processing device 1B may also communicate with the public telephone network like a smartphone to communicate with the public network 11, including the public telephone network.

The configuration (general configuration and VPN-related configuration) of the terminal 21 may be any of various configurations, and may be a known configuration or an application of a known configuration, for example. Communication between the terminal 21 and the router 19 may be wired or wireless. The terminal 21 may also communicate with the public network 11 without going through the router 19. Examples of such a terminal 21 include a terminal with a built-in router and a terminal that communicates with the public telephone network like a smartphone.

The terminal 21 and/or image processing device 1 (which hereinafter may be referred to as the "electronic device in the home 9" in this paragraph) may have what is called device control functionality. Device control functionality restricts to a specific device the device that can connect directly to the electronic device in the home 9 in a wired or wireless manner, or excludes a specific device from the device that can connect directly to the electronic device in the home 9. The connection here refers to a connection allowing a device to be utilized by the electronic device in the home 9 and/or a connection allowing a device to utilize the electronic device in the home 9. Examples of the device include a terminal, an image processing device, and a memory device. Information which designates a specific device and which is stored by the electronic device in the home 9 may be information about types of devices (for example, memory devices and printers) or identification information unique to a device. The configuration for implementing the device control functionality may be the same as, and/or similar to, a known configuration, for example.

The terminal 21 and/or image processing device 1 (which hereinafter may be referred to as the "electronic device in the home 9" in this paragraph) may have functionality to restrict the allowed connection target for communication. Information which designates the allowed connection target and which is stored by the electronic device in the home 9 may be an IP address and/or a medium access control (MAC) address, for example. The allowed connection target may be limited to a VPN (or, from a different perspective, the VPN server 13A or 13B), for example. If the electronic device in the home 9 is transported to the company 5 and directly, physically connected to the network 6A or 6B, the establishment of a connection with an electronic device on the network 6A or 6B may be allowed. The configuration for implementing the functionality for limiting the connection target may be the same as, and/or similar to, a known configuration, for example.

The device control functionality and/or the functionality for limiting the connection target like the above may be used to disallow the transmission of a print job from the terminal 21 to the image processing device 1 without going through a VPN, for example. As another example, functionality like the above may be used to disallow the transmission of image data obtained by a scanner from the image processing device 1 to the terminal 21 without going through a VPN. However, the terminal 21 and/or image processing device 1 are not required to have functionality like the above.

(Variation of Configuration of Communication System)

The example communication systems illustrated in FIGS. 1 and 2 may also be changed as appropriate. For example, although not illustrated in particular, the following variations are possible.

In FIG. 1, the communication system 3A has a single network 6A. However, the communication system 3A may also have two or more networks 6A. In this case, the terminal 21 and image processing device 1A in the home 9 may be capable of communication using some or all of the multiple networks 6A and a VPN through the VPN server 13A in the service company 7. Some or all of the multiple networks 6A may be VPN-connectible to each other through the VPN server 13A to form a LAN-type VPN (site-to-site VPN).

The communication system 3B in FIG. 2 may have a single network 6B or have two or more networks 6B. If the communication system 3B has two or more networks 6B, the terminal 21 and image processing device 1B in the home 9 may be VPN-connectible directly (without going through a VPN server on another network, for example; the same applies hereinafter) to some or all of the multiple networks 6B. Some or all of the multiple networks 6B may be VPN-connectible to each other to form a LAN-type VPN.

Although not illustrated in particular, a communication system may also have the network 6A in FIG. 1 and the network 6B in FIG. 2. In this case, the terminal 21 and image processing device 1 in the home 9 may VPN-connect directly to the network 6B in the same and/or similar manner as in FIG. 2. The terminal 21 and image processing device 1 may also VPN-connect to the network 6A through the VPN server 13B on the network 6B instead of the VPN server 13A in the service company 7 in FIG. 1. The networks 6A and 6B may form a LAN-type VPN.

In FIG. 1, the communication system 3A has an electronic device (for example, the terminal 21 and image processing device 1A, or, from a different perspective, the single network 10A) located in the single home 9. However, the communication system 3A may also have an electronic device located in each of two or more homes 9. In this case, an electronic device in one home 9 and an electronic device in another home 9 may or may not be VPN-connectible through the VPN server 13A in the service company 7.

The communication system 3B in FIG. 2 may have an electronic device located in a single home 9 or an electronic device located in each of two or more homes 9. If the communication system 3B has an electronic device located in each of two or more homes 9, a device in one home 9 and a device in another home 9 may or may not be VPN-connectible through the VPN server 13B in the company 5.

A communication system may have an electronic device located in the company 5 and service company 7 in FIG. 1 and an electronic device (for example, the terminal 21 and image processing device 1B) located in the home 9 in FIG. 2. The image processing device 1B may VPN-connect to the VPN server 13A in the service company 7 by communication with the public network 11, separate from the terminal 21 and the router 19. By extension, the image processing device 1B may communicate using a VPN, through the VPN server 13A, with the in-house equipment 17 in the company 5 or an electronic device in another home 9.

Conversely, a communication system may have an electronic device located in the company 5 in FIG. 2 and an electronic device (for example, the terminal 21 and image processing device 1A) located in the home 9 in FIG. 1. The image processing device 1A may VPN-connect to the VPN server 13B in the company 5 by communication with the public network 11, going through the router 19 shared with the terminal 21. By extension, the image processing device 1A may communicate using a VPN, through the VPN server 13B, with the in-house equipment 17 in the company 5 or an electronic device in another home 9.

A communication system may also have only an electronic device located in two or more homes 9, without having the networks 6A and 6B. That is, a communication system may also include only a plurality of electronic devices that perform operations directly related to a VPN (for example, authentication, tunneling, and encryption).

The home 9 may contain only the image processing device 1, without containing the terminal 21.

(Communication-Related Schemes and the Like)

Known technologies may be used, as appropriate, for communication-related schemes and the like. Examples are given below.

The private network in the home 9 or the company 5 may be a network that is not open to the outside (public network), for example. The manner of isolation from the outside (for example, the layers to be isolated) may be set as appropriate. The private network may be an intranet. A device (for example, the image processing device 1 and terminal 21) on a private network may be a private (local) IP address assigned statically or dynamically. The private IP address may be used for communication within the private network. For communication between the private network and another private network or electronic device, the private IP address may be translated.

A LAN in the home 9 or the company 5 may be a network inside the same building, for example. The LAN may be a network implementing Ethernet® and/or Wi-Fi®. The LAN may also be a network (segment) in which the same signals are physically delivered. For example, if Ethernet is implemented in the home 9 in FIG. 1, a signal outputted by the image processing device 1 is inputted into the terminal 21 through the router 19 (more precisely, a hub or switch included in the router 19) in a physically unaltered state (albeit with reduced signal strength or the like). The reverse is also true.

In the example in FIG. 1, the router 15 in the company 5, the VPN server 13A in the service company 7, and the router 19 in the home 9 may each have a global IP address assigned statically or dynamically, for example. In the example in FIG. 2, the VPN server 13B in the company 5 and the router 19 and image processing device 1B (or a dedicated router for the image processing device 1B) in the home 9 may each have a global IP address assigned statically or dynamically, for example. The global IP address may be used to communicate with the public network 11 (the Internet, for example).

Note that in general, the router 15 in the company 5 and the VPN servers 13A and 13B each have a fixed IP address assigned statically. In general, the router 19 and the image processing device 1B (or a dedicated router for the image processing device 1B) in the home 9 each have a dynamic IP address assigned dynamically. Note that if the home 9 is a part of a housing complex, the router 19 and the image processing device 1B in the home 9 may each have a private IP address assigned statically or dynamically, without having a global IP address.

The image processing device 1B in FIG. 2 does not necessarily have a global IP address. For example, when a smartphone communicates with the public telephone network, each carrier identifies the smartphone according to the carrier's own protocol. Consequently, when the image processing device 1B communicates with the public telephone network like a smartphone, the image processing device 1B may communicate with the public network 11, including the public telephone network, according to a protocol of a carrier in the same manner as a smartphone.

As above, an electronic device that communicates using a VPN may take any of various aspects in relation to IP address. In all such aspects, a service that uses a VPN is provided. In other words, the use of a VPN is a known technology in all such aspects.

One known example is the use of a VPN for communication via a wireless LAN at a cafe. As understood from this technology, the image processing device 1 or the like can also use a VPN with a private IP address assigned by a router that is not owned by the company 5 or the home 9. Another known technology is the use of a VPN through the public telephone network from a smartphone. As understood from this technology, the image processing device 1B does not necessarily have an IP address.

However, among the various VPNs offered by various service companies, a specific VPN may have a requirement that one of the electronic devices within the VPN has a global IP address. Therefore, if various electronic devices have global IP addresses like in the examples given above, the range of available VPN services is expanded. If the global IP addresses of various electronic devices are fixed IP addresses, communication using a VPN will be stable.

A VPN virtually extends a private network over a public network. In other words, a VPN logically divides a single network that physically includes the public network 11. This allows communication over the public network 11 to take place in a secure environment, for example.

Such virtual extension or logical division is achieved by authentication, tunneling, and encryption, for example. However, communication using a VPN may also take place by performing authentication and tunneling, without performing encryption. Note that tunneling can also be thought of as a type of encryption.

Authentication involves confirming the legitimacy of the connection target. Examples of authentication methods include methods using account information (for example, an identifier (ID) and password), a static key, a common key (shared key), a combination of a private key and a public key, an electronic signature, an electronic certificate, or a security token, and methods implementing a combination of two or more of the above (for example, multi-factor authentication).

Tunneling involves handling two physically or logically distant points over a network as if the two were the same point. Tunneling is achieved by encapsulation, for example. Encapsulation involves embedding an entire packet in a payload according to a different protocol, in a different layer, or in the same layer upon communication, for example. Tunneling may be performed in an appropriate layer, such as layer 3 (the network Layer) or layer 2 (the data link layer), for example.

Encryption involves converting the information to be transmitted and received into a form that is undecipherable to a third party. Encryption may be applied to the payload only, or to both the header and the payload. From a different perspective, encryption may be applied in an appropriate layer, such as the network layer, the transport layer, and/or the session layer, for example. An appropriate encryption scheme may be implemented. Examples of encryption schemes include schemes using a shared key and schemes using a combination of a private key and a public key.

The protocol for a VPN may be known, novel, or defined independently by the company 5 or the service company 7. Examples of known protocols for a remote access VPN include a combination of Layer 2 Tunneling Protocol (L2TP) and Security Architecture for Internet Protocol (IPsec), and Point-to-Point Tunneling Protocol (PPTP).

(Configuration of Image Processing Device)

The image processing device 1 includes the following components, for example. A housing 23 forms the outer shape of the image processing device 1. A printer 25 prints. A scanner 27 (image scanner) scans. An input/output unit 29 accepts a user operation and/or presents information to a user. A controller 31 controls each unit (25, 27, and 29) and communicates with external equipment. Note that the input/ output unit 29 is an example of a UI unit. The term input/output unit 29 in the description of the embodiment may be substituted with the term UI unit or a term denoting another specific example (described later) of a UI unit other than the input/output unit 29, as appropriate, insofar as the substitution does not create a contradiction or the like. The controller 31 includes a VPN processing unit, as described later. In the description of the embodiment, the term controller 31 may be substituted with VPN processing unit, as appropriate, insofar as the substitution does not create a contradiction or the like.

Some or all of the above components may be common to each other (or considered as such), like in the illustrated example. For example, the housing 23 may be considered a part of the printer 25 or the scanner 27. In the description of the present embodiment, the controller 31 is a conceptually singular controller (which may be plurally distributed in terms of hardware) that controls the operations (including printing and scanning, for example) of the image processing device 1 as a whole. In this case, the printer 25 or the scanner 27 may be conceptualized by the mechanistic portion only, not including a controller, or with the inclusion of a controller (part of the controller 31).

The printer 25, scanner 27, input/output unit 29, and controller 31 (hereinafter, the term component refers to such components other than the housing 23 in this paragraph, the next paragraph, and subsequent paragraphs thereafter) are provided to the housing 23. In other words, or from a different perspective, the housing 23 may hold or support a plurality of components, or be mechanically connected or coupled to a plurality of components. In providing the plurality of components to the housing 23, the plurality of components can be said to be provided in a unified manner. Note that, as understood from the preceding description, when the components are referred to as being provided or the like in the housing 23, the housing 23 may also be considered to be part of the components.

When the components are referred to as being provided to the housing 23, the components and the housing 23 are typically secured to each other (obviously excluding movable parts), for example. By extension, the components themselves are also secured to one another. In another example, the components and the housing 23 cannot be separated from each other and placed in different locations (for example, different homes 9) unless the image processing device 1 is disassembled by removing screws or the like. By extension, the components themselves cannot be separated from one another and placed in different locations. Unlike the above example, when the components are referred to as being provided to the housing 23, the components may also be removable from the housing.

When the components are referred to as being provided to the housing 23, the components and the housing 23 may be in any specific positional relationship. For example, the components may be accommodated inside the housing 23, formed integrally on a wall surface of the housing 23, protrude from a wall surface of the housing 23, or be oriented variably with respect to the housing 23. In the illustrated example, the printer 25 and scanner 27 (image processing unit) and the controller 31 may be considered to be accommodated in the housing 23. The input/output unit 29 may be considered to be formed integrally on a wall surface of the housing 23.

The image processing device 1 (or, from a different perspective, the housing 23) may be of any size and shape. For example, the image processing device 1 may be of a size (mass) that can be carried by a single person, like a multi-function device or printer for home use, or may be of a size (mass) that cannot be carried by a single person, like a multi-function device or printer for commercial use.

As mentioned already, the printer 25, scanner 27, input/output unit 29, and controller 31 may be positioned appropriately with respect to the housing 23. In the illustrated example, the printer 25 is located in the lower part of the housing 23. The scanner 27 is located in the upper part of the housing 23. The input/output unit 29 is located in the upper part of the housing 23 where the scanner 27 is not, at a position along one side in a plan view. The controller 31 is positioned inside the housing 23. Note that the description of the present embodiment assumes the above arrangement out of convenience.

The printer 25 is configured to print onto a paper sheet loaded into the housing 23 or in a tray protruding outward from the housing 23, and to eject the paper sheet after printing, for example. The printer 25 may have any of various specific configurations, and may be the same as, and/or similar to, a known configuration, for example.

For instance, the printer 25 may be an inkjet printer that prints by ejecting ink, a thermal printer that prints by heating thermal paper or an ink ribbon, or an electrophotographic printer (for example, a laser printer) that transfers toner adhering to a photoreceptor that has been irradiated with light. The inkjet printer may be of the piezoelectric type, in which pressure is applied to ink by piezoelectric elements, or the thermal type, in which pressure is applied to ink by bubbles generated in the ink through the application of heat.

In another example, the printer 25 may also be a line printer having a head that extends over the width of a paper sheet (the direction intersecting the transport direction of a paper sheet), or a serial printer having a head that moves in the width direction of a paper sheet. The printer 25 may be a color printer or a monochrome printer. The printer 25 may be capable of forming an image of any kind or be capable of printing text only.

The scanner 27 scans by, for example, using a plurality of image sensors (not illustrated) to capture an image of a document placed on a platen glass (hidden by the lid in the drawing). The platen glass is exposed from the top of the housing 23, and the plurality of image sensors move along the platen glass from underneath. The scanner 27 likewise may have any of various configurations, and may be the same as, and/or similar to, a known configuration, for example.

Figure 13:
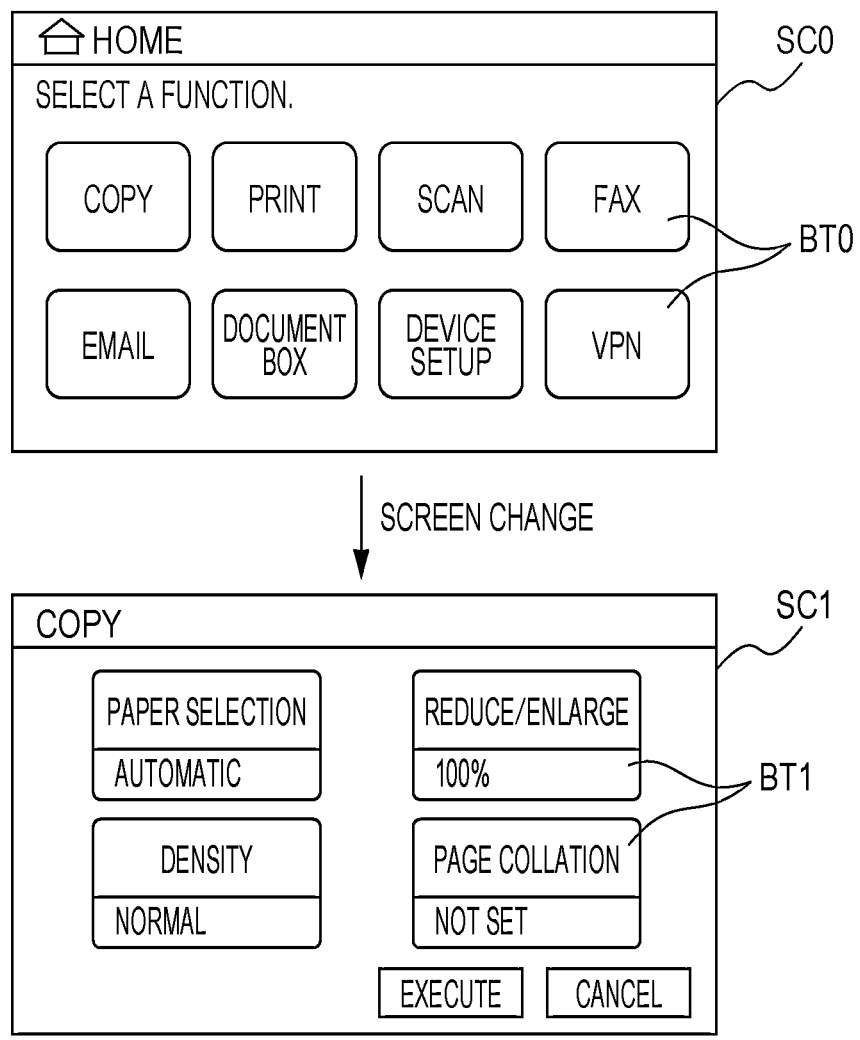
FIG. 13 is a diagram illustrating an example of screens displayed on a touch panel included in a UI unit.

The input/output unit 29 may be configured in any way. For example, the input/output unit 29 includes an operation unit 33 (reference sign in FIG. 3) that accepts a user operation and a display 35 (reference sign in FIG. 3) that visually presents information to the user. Note that the input/output unit 29 is not necessarily provided, and the input/output unit 29 may also include only one of either the operation unit 33 or the display 35. The input/output unit 29 may also include an acoustic unit that presents information to the user via sound. The input/output unit 29 (UI unit) may accept the input of an operation related to the printer 25 and/or the scanner 27. An operation related to one or both of the printer 25 and the scanner 27 is, for example, an "execution" and/or "setup" operation related to the printer 25 and/or the scanner 27. A specific example thereof is described later (FIG. 13 and the like).

The operation unit 33 may be configured in any way. For example, the operation unit 33 accepts a touch operation by the user. Such an operation unit 33 may include a touch panel and/or one or more push-buttons, for example. A push-button is, in other words, a hardware key. A push-button may have a switch in which a movable contact is pushed toward a fixed contact, may be a pressure sensor that detects pressure from a finger, or may be a sensor that detects a change in capacitance caused by the contact (or proximity) of a finger. All buttons other than software keys formed by a touch panel may be classified as push-buttons. A touch panel (or push-button) may be a device that does not require the contact (touch) of a finger or the like (for example, a device that detects the proximity of a finger or the like) for operation. However, the description of the embodiment may use a term such as touch out of convenience. Note that the operation unit 33 may also accept an operation by another method, such as a voice operation.

The display 35 may be configured in any way. For example, the display 35 may include at least one selected from the group consisting of a display capable of displaying an image of any kind, a display limited to displaying text of any kind, a display capable of displaying only specific text and/or specific graphics, and an indicator light 35*a*. Herein, an image is a concept that includes text. Examples of a display that displays an image of any kind or text of any kind include a liquid crystal display or organic light-emitting diode display with a relatively large number of pixels arranged regularly. A display that displays specific text and/or specific graphics may be a liquid crystal display with a limited number of pixels or shape, or a segmented display such as a seven-segment display, for example. A segmented display may take any of various forms, including a liquid crystal display. An indicator light 35*a* may include a light-emitting diode (LED), for example. An appropriate number of indicator lights 35*a* may be provided. Note that the following description may presume the display 35 is capable of displaying an image of any kind out of convenience.

Unlike the illustrated example, the image processing device 1 may also be largely different in concept from a general multi-function device or printer installed in the home 9. For example, the printer 25 may also print onto a roll of paper. The image processing device 1 may also include a robot and use an inkjet head to apply paint to a car body or the like. The image processing device 1 may be small enough to be held in one hand, and the image processing device 1 itself may be scanned across a medium to print and/or scan.

(Hardware Configuration Related to Signal Processing Subsystem of Image Processing Device)

Figure 3:
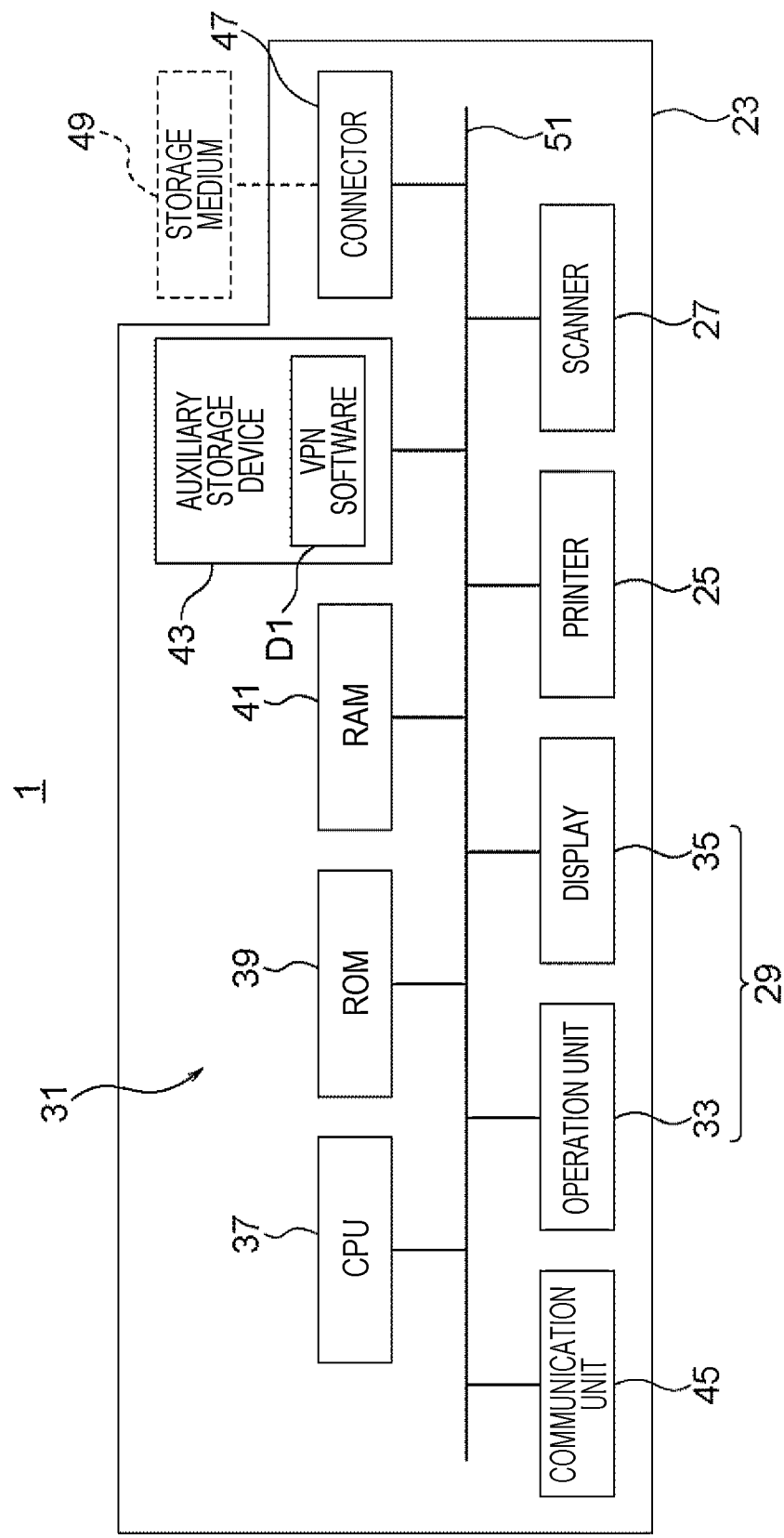
FIG. 3 is a schematic diagram illustrating a hardware configuration related to a signal processing subsystem of an image processing device according to an embodiment.

FIG. 3 is a schematic diagram illustrating a hardware configuration related to a signal processing subsystem of the image processing device 1.

As described above, the image processing device 1 includes the controller 31, the operation unit 33, the display 35, the printer 25, and the scanner 27. Besides the above, the image processing device 1 also includes a communication unit 45 and a connector 47.

The controller 31 is configured in the same and/or similar way as a computer, for example. In a specific example, the controller 31 includes a central processing unit (CPU) 37, read-only memory (ROM) 39, random access memory (RAM) 41, and an auxiliary storage device 43. The controller 31 is constructed by the CPU 37 executing a program stored in the ROM 39 and/or the auxiliary storage device 43. Note that in addition to the portion constructed as above, the controller 31 may also include a logic circuit configured to perform only a certain operation.

FIG. 3 illustrates an example of VPN software D1 stored in the auxiliary storage device 43 as the program to be executed by the CPU 37. The CPU 37 executes the VPN software D1, and thereby constructs, as part of the controller 31, a VPN processing unit (described later) for communicating using a VPN. Note that a portion of the VPN software D1 (for example, a portion related to the construction of an update processing unit 57*a* described later) may also be stored in the ROM 39. In an aspect in which the VPN software D1 is not updated, the entirety of the VPN software D1 may also be stored in the ROM 39.

The communication unit 45 is a portion of an interface for the image processing device 1 to communicate with external equipment (for example, the public network 11), namely the portion not included in the controller 31. The communication unit 45 may include only a hardware component, or may include a portion implemented by software in addition to a hardware component. In the latter case, the communication unit 45 need not be clearly distinguished from the controller 31.

In a specific example, if the image processing device 1 has a wired connection to external equipment, the communication unit 45 may have a connector or port to which a cable is connected. Herein, a port is a concept that includes a software port in addition to a connector. In another example, if the image processing device 1 has a wireless (for example, radio-wave) connection to external equipment, the communication unit 45 may have a radio frequency (RF) circuit that converts a baseband signal into a high-frequency signal and an antenna that converts a high-frequency signal into a wireless signal. In both the wired and wireless cases, the communication unit 45 may also include an amplifier and/or filter, for example.

The connector 47 is for connecting peripheral equipment to the image processing device 1, for example. The connector 47 may conform to any of various standards, one example of which is Universal Serial Bus (USB). In FIG. 3, a storage medium 49 is illustrated as an example of peripheral equipment connected to the connector 47. Note that, as described above, the use of such peripheral equipment through the connector 47 may also be disallowed by the device control functionality.

The storage medium 49 is non-volatile memory. The storage medium 49 may be read-only, or may be both readable and writable. In the illustrated example, the storage medium 49 is directly connected to the connector 47. A USB memory is an example of such a storage medium 49. Unlike the illustrated example, a device (such as a reader) that at least reads the storage medium 49 may also be connected to the connector 47.

The various components (25, 27, 33, 35, 37, 39, 41, 43, 45, and 47) described above are connected by a bus 51, for example. In FIG. 3, all of the components are schematically connected to a single bus 51. In an actual product, a plurality of buses may be connected in an appropriate format. For example, an address bus, a data bus, and a control bus may be provided. A crossbar switch and/or link bus may also be applied.

FIG. 3 is merely a schematic diagram. Consequently, for example, various devices (for example, the CPU) may be provided in a distributed and plural manner in actuality. The CPU 37 illustrated may be a concept that includes a CPU included in the printer 25 or the scanner 27. An interface, not illustrated, may be interposed between the bus 51 and various devices (for example, the printer 25 or the scanner 27).

(Functional Configuration of Controller)

Figure 4:
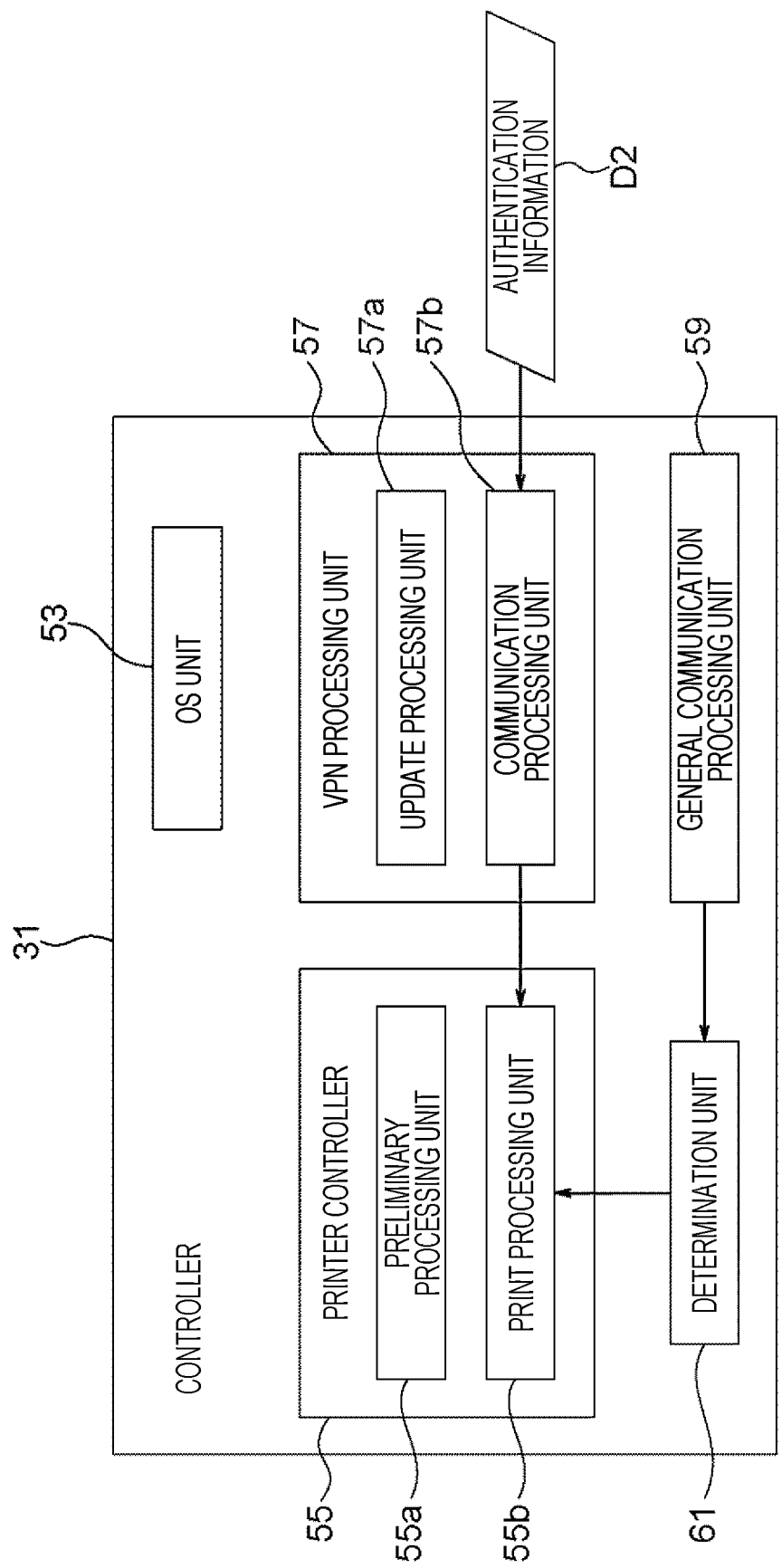
FIG. 4 is a block diagram illustrating key portions of the configuration, from a functional perspective, of a controller of an image processing device according to an embodiment.

FIG. 4 is a block diagram illustrating key portions of the configuration, from a functional perspective, of the controller 31 of the image processing device 1.

For example, the controller 31 has various functional units (53, 55 (55a and 55b), 57 (57a and 57b), 59, and 61). As described above, the CPU 37 executes a program stored in the ROM 39 and/or the auxiliary storage device 43 to enact the various functional units, for example. Operations and the like by each functional unit are as follows.

An OS unit 53 is constructed by the CPU 37 executing an operating system (OS) stored in the ROM 39, for example. The OS unit 53 oversees the operations of the image processing device 1 as a whole. In other words, the OS unit 53 controls operations by the other functional units.

A printer controller 55 controls the printer 25. The printer controller 55 includes a preliminary processing unit 55a that exercises control related to a preliminary operation performed by the printer 25 prior to printing and a print processing unit 55b that exercises control directly related to printing. The preliminary operation will be described later. The print processing unit 55b prints according to an inputted print job, for example. A print job includes image data in a format supported by the printer 25, for example.

The VPN processing unit 57 is constructed by the CPU 37 executing the VPN software D1, for example. The VPN processing unit 57 includes an update processing unit 57a that updates the VPN software D1 and a communication processing unit 57b directly responsible for communication using a VPN. Note that in an aspect in which the VPN software D1 is not updated, the VPN processing unit 57 does not necessarily include the update processing unit 57a.

In one example, the communication processing unit 57b acquires authentication information D2 and uses the authentication information D2 to establish a connection with a VPN (or, from a different perspective, the VPN server 13A or 13B). In another example, the communication processing unit 57b encapsulates and encrypts data and then transmits the processed data to the VPN server 13A or 13B, and/or decapsulates and decrypts encapsulated and encrypted data received from the VPN server 13A or 13B. In this way, the communication processing unit 57b communicates using a VPN.

In one example, the communication processing unit 57b may VPN-connect to a specific VPN server prescribed in the VPN software D1 or VPN-connect to any VPN server designated by the user through the operation unit 33. In another example, if a single VPN has a plurality of VPN servers, a VPN may be designated as a connection destination and the communication processing unit 57b may select one among the plurality of VPN servers for the VPN designated the connection destination and connect to the selected VPN server.

In all of the above aspects, the communication processing unit 57b retains and/or obtains information specifying a VPN server as the connection destination. This information is a host name or an IP address, for example. The host name is associated with an IP address by the Domain Name System (DNS), for example. The IP address is a fixed IP address, for example.

In one example, the communication processing unit 57b itself uses received information and/or outputs received information to another functional unit or device. FIG. 4 illustrates operations in which the communication processing unit 57b outputs a print job received from external equipment to the print processing unit 55b. The communication processing unit 57b also transmits internally generated information, or information obtained from another functional unit or device, to equipment external to the image processing device 1 by communication using a VPN. For example, although not illustrated in particular, the communication processing unit 57b transmits image data obtained from scanning by the scanner 27 to external equipment.

A general communication processing unit 59 performs processing related to general communication not using a VPN. For example, the general communication processing unit 59 performs processing related to communication with the public network 11 without the use of a VPN and communication within the network 10A in the home 9. A portion of the general communication processing unit 59 may be shared with the VPN processing unit 57. Some or all of the operations executed by the non-shared portion may be disallowed. The general communication processing unit 59 may be considered as not being provided if all of the operations executed by the non-shared portion are disallowed or if a non-shared portion is absent.

A determination unit 61 allows and disallows printing by the print processing unit 55b. The determination unit 61 may allow and disallow printing on the basis of appropriately obtained information. FIG. 4 illustrates an aspect in which a determination is made on the basis of information obtained from the general communication processing unit 59.

(Authentication Information)

The authentication information D2 is information used to indicate the legitimacy of a communication peer. From a different perspective, the authentication information D2 is information held only by an electronic device and/or account (specific electronic device and/or account) that is authorized to establish a connection with a VPN (VPN server 13A or 13B). The authentication information D2 may be information individual to each electronic device and/or account authorized to establish a connection with a VPN, or information common to two or more electronic devices and/or accounts. Specific examples of the authentication information D2 include account information (for example, an ID and password), a static key, a common key, a private key (or public key), an electronic certificate, information obtained from a security token, and/or biometric information (for example, fingerprint or iris information).

As understood from the examples given above, the authentication information D2 may be the information itself to be transmitted to the VPN server 13A or 13B, or information used to generate the information to be transmitted to the VPN server 13A or 13B. Examples for the former case includes account information, a static key, an electronic certificate, information obtained from a security token, and biometric information. Examples for the latter case include a common key and a private key (or public key). Note that obviously both the former and the latter may also be used as the authentication information D2.

(UI Unit Related to Acquisition of Authentication Information)

In the image processing device 1, the authentication information D2 is acquired through the UI unit provided to the housing 23. The meaning of being provided to the housing 23 is already described. The UI unit is the target of an input action performed by the user.

Examples of an input action performed on the UI unit include input (for example, key input) into the operation unit 33 and the connection of the storage medium 49 to the connector 47. Other examples of an input action performed on the UI unit include the insertion of a card into a card reader 75 (see FIG. 20 described later) and the input of biometric information into a biometric authentication sensor. A fingerprint sensor 77 (FIG. 20 described later) is given later as one example of a biometric authentication sensor. In an aspect in which the biometric information is visually acquirable information, such as fingerprint or iris information, the scanner 27 may also be used as the biometric authentication sensor.

As the above examples of an input action make clear, the operation unit 33, the connector 47, the card reader 75, and the biometric authentication sensor are each an example of the UI unit. A combination of two or more of the above may also be considered an example of the UI unit. In the description of the embodiment, the term UI unit may be interpreted as any of the above meanings, insofar as the interpretation does not create a contradiction or the like.

Note that an input action is in other words an action causing the image processing device 1 to acquire information (here, the authentication information D2). Consequently, if a storage medium 49 not containing any information to be inputted is connected to the connector 47, for example, such a connection does not correspond to an input action. The same applies to the insertion of a card, which corresponds to an input action on the premise that information is recorded in the card.

Since the UI unit is the target of an input action by the user, the communication unit 45 that communicates with other equipment does not correspond to the UI unit. Consequently, for example, an image processing device that acquires authentication information D2 stored in a smartphone through communication does not correspond to an image processing device that acquires the authentication information D2 through the UI unit.

Examples of the authentication information D2 inputted from the operation unit 33 include account information and information obtained from a security token. Examples of the authentication information D2 inputted from the connector 47 or the card reader 75 include a static key, a common key, a private key (or public key), and an electronic certificate. The authentication information D2 inputted from the biometric authentication sensor is, of course, biometric information.

Note that obviously authentication information D2 from two or more UI units may be used. Account information may be inputted from the operation unit 33 initially and recorded to non-volatile memory (for example, the auxiliary storage device 43), and acquired from the non-volatile memory thereafter. That is, the manner of acquiring the authentication information D2 may change.

The acquisition of the authentication information D2 by the image processing device 1 may also be described from a perspective different from acquisition through the UI unit. For example, the controller 31 may be considered to acquire the authentication information D2 from a device that the controller 31 controls. Examples of such a device include the operation unit 33, non-volatile memory (the ROM 39, auxiliary storage device 43, and/or storage medium 49), the card reader 75, and the biometric authentication sensor.

Consider, as an aspect different from the present embodiment, an aspect in which the controller 31 (image processing device 1) acquires the authentication information D2 stored in an auxiliary storage device of a smartphone through communication. In this case, a controller of the smartphone, and not the controller 31, controls the auxiliary storage device to read out the authentication information D2. Obviously, an unreasonably broad interpretation could consider the controller 31 as controlling the auxiliary storage device of the smartphone, but the present disclosure is not to be construed as such a broad interpretation of the device that the controller 31 controls.

On the other hand, in the present embodiment, the controller 31 (or, from a different perspective, the CPU 37) clearly controls the ROM 39 and the auxiliary storage device 43 to read out information (that is, the ROM 39 and the auxiliary storage device 43 are clearly non-volatile memories controlled by the controller 31). The controller 31 can also be said to control the storage medium 49, such as a USB memory, directly connected to the connector 47. If a device (such as a reader) that reads out information from the storage medium 49 is interposed between the connector 47 and the storage medium 49, and the device is dedicated to reading and/or writing information from or to the storage medium 49, the controller 31 can also be said to control the storage medium 49 and/or the device for the medium.

For example, if the operation unit 33 is considered to include a switch circuit that is opened and closed by a switch, the controller 31 can be said to control the supply of power to the switch circuit. The operation unit 33 (for example, a touch panel) may include an independent controller that controls the supply of power to the switch circuit, separately from the controller that controls the overall operations of the image processing device 1. Even in this case, the controller 31 can be said to control the operation unit 33 if the controller 31 is considered to include the independent controller (if the operation unit 33 is defined to not include the independent controller). Even if the independent controller is considered to be separate from the controller 31, the controller 31 can be said to control the operation unit 33 because the operation of the independent controller is under the control of the controller 31.

The above describes the operations by which the image processing device 1 transmits information for authentication to the VPN server 13A or 13B. The image processing device 1 may authenticate the VPN server 13A or 13B as appropriate. For example, the image processing device 1 may authenticate the VPN server 13A or 13B by receiving the same and/or information as the information transmitted for authentication. The image processing device 1 may also simply perform an operation such as checking the fixed, global IP addresses of the VPN servers 13A and 13B.

(Operations by Image Processing Device)

Figure 5:
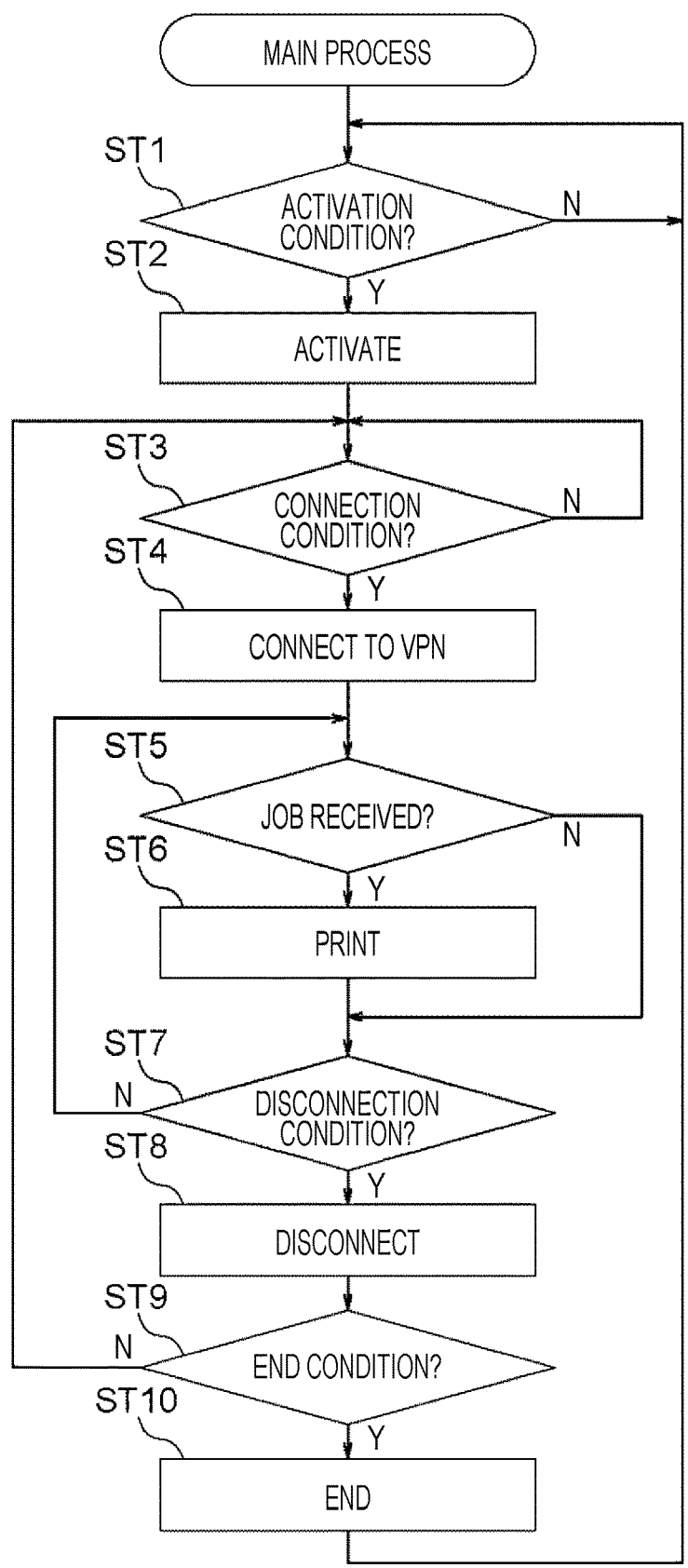
FIG. 5 is a flowchart illustrating the procedure of a main process executed by a controller of an image processing device according to an embodiment.

FIG. 5 is a flowchart illustrating the procedure of a main process executed by the controller 31 of the image processing device 1. This process relates to overall communication using a VPN. However, details are omitted. This process is started automatically when the image processing device 1 is powered on and the OS boots up (when the OS unit 53 is constructed). FIG. 5 illustrates an example of an aspect in which the VPN server (or VPN) of the connection destination is designated in advance. For example, the connection destination is prescribed in the VPN software D1 or designated by the user in an initial setup prior to the process in FIG. 5.

In step ST1, the controller 31 (OS unit 53) determines whether a condition (activation condition) for launching the VPN software D1 is met. The controller 31 stands by when the determination is negative. In other words, the controller 31 repeats step ST1 on a predetermined cycle. The controller 31 proceeds to step ST2 when the determination is positive.

The activation condition may be set appropriately. For example, the condition may be that a certain operation is performed on the operation unit 33. That is, the condition may be that the user gives an activation instruction. In addition to, or instead of, the above, the activation condition may be that the VPN software D1 has never been launched since power-on. That is, the VPN software D1 may be launched automatically after power-on. Note that in this case, the VPN software D1 may be launched as part of a series of operations after the OS boots up, without making the determination of whether the activation condition is met (without providing step ST1).

In step ST2, the controller 31 (OS unit 53) launches the VPN software D1 (activates the VPN processing unit 57). More specifically, for example, the communication processing unit 57b is constructed by the CPU 37 executing at least a portion of the VPN software D1. Note that, as understood from the description that follows, the update processing unit 57a may be constructed, predetermined processing may be executed by the update processing unit 57a and the like, and thereafter, the communication processing unit 57b may be constructed and the like.

In step ST3, the controller 31 (communication processing unit 57b) determines whether a condition (connection condition) for starting communication using a VPN is met. The controller 31 stands by when the determination is negative. In other words, the controller 31 repeats step ST3 on a predetermined cycle. The controller 31 proceeds to step ST4 when the determination is positive.

The connection condition may be set appropriately. For example, the condition may be that a certain operation is performed on the operation unit 33. That is, the condition may be that the user gives a connection instruction. In addition to, or instead of, the above, the connection condition may be that a VPN connection has never been established since the launch of the VPN software D1. That is, a VPN connection may be established automatically after the launch of the VPN software D1. Note that in this case, a connection using a VPN may be established as part of a series of operations after launching the VPN software D1, without making the determination of whether the connection condition is met (without providing step ST3).

As described above, the activation condition in step ST1 may be that the VPN software D1 has never been launched since power-on, or step ST1 may be omitted. The connection condition in step ST3 may be that a VPN connection has never been established since the launch of the VPN software D1, or step ST3 may be omitted. As understood from the above, the process up to the establishment of a connection using a VPN may be performed automatically after power-on.

In step ST4, the controller 31 (communication processing unit 57b) establishes a connection (VPN connection) using a VPN. To establish this connection, the controller 31 acquires the authentication information D2 described above to perform authentication.

Note that the determination of the connection condition (step ST3) and the establishment of a VPN connection (step ST4) are not necessarily clearly distinguishable. From a different perspective, the order of the two may be reversed. One example of a general VPN connection procedure on a PC involves displaying an image (for example, a window; for something similar, see the screen SC2 in the middle of FIG. 14 described later) for accepting a VPN connection instruction after launching VPN software. The window contains, for example, blank fields (in FIG. 14, the blank fields BK) for inputting account information and a button (in FIG. 14, the button BT2 labeled "Connect") for giving an instruction to establish a connection. The user inputs account information (at least the first time) and then presses the button. In this example, the determination of the connection condition and the establishment of a VPN connection (that acquisition of authentication information) are intermingled. Such an example may be applied to steps ST3 and ST4.

In step ST5 and thereafter, communication using a VPN and various processes using such communication may be performed. FIG. 5 illustrates an example of processes (steps ST5 and ST6) related to printing by the printer 25. Examples are given below.

In step ST5, the controller 31 (print processing unit 55b) determines whether a print job is received from external equipment (for example, the terminal 21 or the in-house equipment 17) by communication through a VPN. If the determination is positive, the controller 31 proceeds to step ST6. If the determination is negative, the controller 31 skips step ST6 and proceeds to step ST7.

In step ST6, the controller 31 (print processing unit 55b) controls the printer 25 to print according to the received print job.

Although not illustrated in particular, another process may be performed between steps ST4 and ST7. For example, the other process may involve transmitting image data obtained through scanning by the scanner 27 to external equipment (for example, the terminal 21 or the in-house equipment 17) by communication through a VPN. The transmission timing may be when scanning is performed and image data is obtained, or when a certain operation is performed after image data is obtained, such as an operation of selecting the image data to be transmitted.

In step ST7, the controller 31 (communication processing unit 57b) determines whether a condition (disconnection condition) for disconnecting from the VPN is met. If the determination is negative, the controller 31 returns to step ST5 (or, from a different perspective, after step ST4). If the determination is positive, the controller 31 proceeds to step ST8.

The disconnection condition may be set appropriately. For example, the condition may be that a certain operation is performed on the operation unit 33. That is, the condition may be that the user gives a disconnection instruction. In addition to, or instead of, the above, the disconnection condition may be that an event that raises security concerns has occurred. For example, the event may be a change in the IP address of the party with which a connection is established.

In step ST8, the controller 31 (communication processing unit 57b) disconnects from the VPN. When disconnecting, a predetermined process may be performed in accordance with the communication protocol of the VPN.

Note that the image processing device 1 may have a sleep mode. In this case, the VPN processing unit 57 may remain active in sleep mode, or the VPN connection may be maintained in sleep mode. In sleep mode, the brightness may be lowered for the display screen of the display 35, or the display screen on the display 35 may be turned off, for example. Sleep mode may consume less power. If the VPN processing unit 57 remains active in sleep mode, the VPN processing unit 57 can restore a VPN connection quickly when the image processing device 1 comes out of sleep mode. If the VPN connection is maintained in sleep mode, communication through a VPN (receiving a print job, for example) can take place even while in sleep mode. Note that the VPN processing unit 57 does not necessarily remain active in sleep mode, and the VPN connection is not necessarily maintained in sleep mode.

In step ST9, the controller 31 (VPN processing unit 57 or OS unit 53) determines whether a condition (end condition) for terminating the VPN software D1 is met. If the determination is negative, the controller 31 returns to step ST3. If the determination is positive, the controller 31 proceeds to step ST10.

The end condition may be set appropriately. For example, the condition may be that a certain operation is performed on the operation unit 33. That is, the condition may be that the user gives an end instruction.

Note that step ST7 may be omitted, and steps ST8 and ST10 may be performed consecutively after step ST9. That is, the disconnection from the VPN and the termination of the VPN software D1 may be inseparable. This aspect may be combined with the aspect described above in which a VPN connection is established automatically after power-on, for example.

(Example of Connection Condition)

The description of step ST3 mentions that a VPN connection may be established when the user gives a connection instruction, or a VPN connection may be established automatically. The following illustrates an example of a process executed by the controller 31 in the former aspect.

FIG. 5 illustrates an example of an aspect in which the VPN server (or VPN) of the connection destination is designated in advance. The following takes the example of an aspect in which the connection destination is selected when connecting to a VPN. Note that, as described above, the user may designate a VPN and the image processing device 1 may select a VPN server for the designated VPN, but for convenience, the following illustrates an example of an aspect in which the VPN server is designated.

Figure 11:
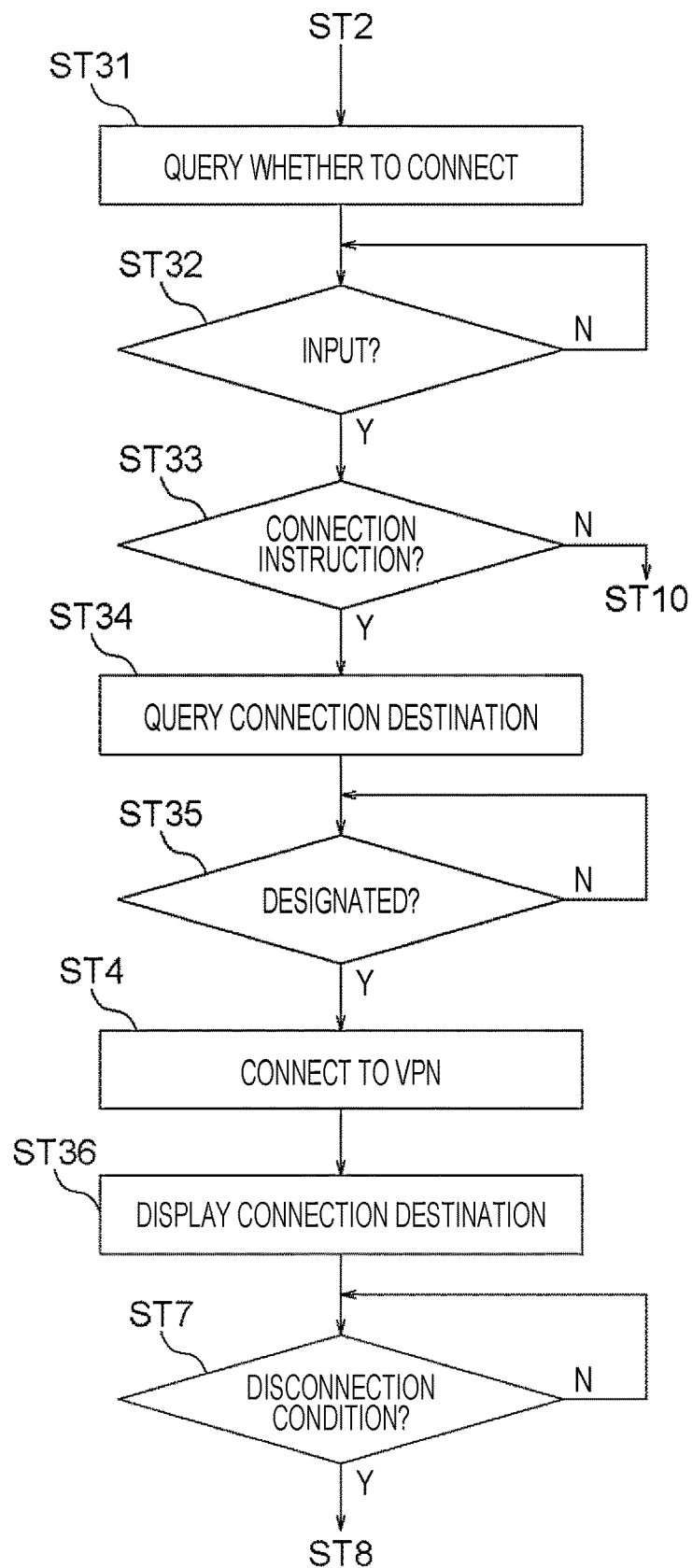
FIG. 11 is a flowchart illustrating an example of details of a portion of FIG. 5.

FIG. 11 is a flowchart illustrating an example procedure of a process executed by the controller 31 after step ST2.

In the diagram, steps ST31 to ST35 correspond to at least a portion of step ST3. Step ST36, like steps ST5 and ST6, is a process performed while connected to a VPN, and may be performed in parallel with steps ST5 and ST6 by multitasking, for example.

In step ST31, the controller 31 (communication processing unit 57b) causes the display 35 to display information (for example, an image) querying the user about whether to establish a connection to a VPN. The image may contain text and/or graphics (the same applies to steps ST34 and ST36 described later). In an aspect in which the display 35 is combined with the operation unit 33 to form a touch panel, the image may contain a button or the like for accepting a user operation (the same applies to step ST34 described later).

In step ST32, the controller 31 (communication processing unit 57b) determines whether the user performs an operation on the operation unit 33 in response to the query. The controller 31 stands by when the determination is negative. In other words, the controller 31 repeats step ST32 on a predetermined cycle. The controller 31 proceeds to step ST33 when the determination is positive.

In step ST33, the controller 31 (communication processing unit 57b) determines whether the operation on the operation unit 33 gives an instruction to connect to a VPN. If the determination is positive, the controller 31 proceeds to step ST34. If the determination is negative, the controller 31 proceeds to step ST10 (or step ST9) described with reference to FIG. 5.

In step ST34, the controller 31 (communication processing unit 57b) causes the display 35 to display information (for example, an image) querying the user for the VPN server (or VPN) to serve as the connection destination. This display may present information on one or more connection destination candidates, or prompt the user to input information on the connection destination, for example. The presented and/or inputted information on the connection destination is a hose name or an IP address (or a name given to a VPN), for example. The information on the connection destination may also be a name and/or graphic of any kind that the user or other person has stored in advance in the controller 31 in association with a host name or a fixed IP address. The same applies to the connection destination displayed in step ST36 described later.

In step ST35, the controller 31 (communication processing unit 57b) determines whether the connection destination is designated by an operation on the operation unit 33. As understood from the description of the display in step ST34, this operation may be an operation of selecting from among a plurality of candidates or an operation of inputting information through key input or the like. Note that the content displayed on the display 35 may change depending on the operation in step ST35. For example, a selected candidate may be displayed differently from other candidates, or information on the connection destination may be displayed in a previously blank field.

If the determination in step ST35 is negative, the controller 31 repeats step ST35 (stands by) on a predetermined cycle. If the determination is positive, the controller 31 proceeds to step ST4. This corresponds to the controller 31 proceeding to step ST4 when the determination is positive in step ST3 of FIG. 5. Step ST4 is as described with reference to FIG. 5. Note that the acquisition of the authentication information D2 described as a portion of step ST4 may also be performed before step ST35.

In step ST36, the controller 31 (communication processing unit 57b) causes the display 35 to display information (for example, an image) indicating the connection destination with which a VPN connection was established in step ST35. This display continues until the determination is positive in step ST7 described with reference to FIG. 5 and the controller 31 disconnects from the VPN (step ST8). That is, after a connection to a VPN is established, the controller 31 displays information indicating the maintained connection with the connection destination for as long as the connection is maintained. The display at this time may show only information on the connection destination that is currently connected, or show information on the connection destination that is currently connected in a manner different from information on connection destinations that are not currently connected.

Note that in the above aspect, the user can know that a VPN connection is active by looking at the displayed connection destination. Consequently, the display indicating the connection destination in step ST36 may also be considered to indicate an active connection to a VPN.

As above, the image processing device 1 may cause the display 35 to display query information (which may be referred to as information related to a second query) about whether to connect to a VPN. In this case, for example, a VPN connection is not established if the user does not need one, for example, thereby lessening the load on the image processing device 1.

The image processing device 1 may cause the display 35 to display information related to the connection destination of a VPN connection if the user performs an input action on the UI unit (for example, the operation unit 33) indicating a positive response to the second query. In one example, the image processing device 1 may display information related to one or more connection destinations and prompt the user to make a selection, as described with reference to steps ST34 and ST35. In another example, unlike steps ST34 and ST35, if only one connection destination exists or if the connection destination is preset, the image processing device 1 may VPN-connect to the connection destination and display the connection destination. Such an aspect improves user convenience by simplifying the selection and/or confirmation of a VPN-related connection destination.

While a connection to a VPN is active, the image processing device 1 may cause the display 35 to display information indicating the same (an example of which is given later) or information indicating the connection destination. In this case, the user can easily check that a VPN connection is active. The result is a speedup in the confirmation work when transmitting a print job from the terminal 21 to the image processing device 1, for example, and improved work efficiency.

(Example of Display on UI Unit: Screen Related to Basic Operations)

As described above, the UI unit may include a touch panel (one example of the input/output unit 29). In this case, the image processing device 1 (controller 31) may display an appropriate screen (in other words, an image; the same applies hereinafter) on the touch panel. The following gives examples of screens displayed on the touch panel.

A screen SC0 illustrated at the top of FIG. 13 illustrates a home screen displayed as an initial screen when the image processing device 1 is powered on or comes out of sleep mode. The screen SC0 has a plurality of buttons BT0 (software keys). The plurality of buttons BT0 are for selecting a function (operation) from among different functions. If one of the buttons BT0 is touched, the screen displayed on the touch panel changes to a screen for instructing the image processing device 1 to set up and/or execute the function corresponding to the touched button BT0, as illustrated at the bottom of FIG. 13. FIG. 13 illustrates the example of a screen SC1 displayed when a "Copy" button BT0 is touched.

The functions corresponding to the plurality of buttons BT0 displayed on the screen SC0 may be set appropriately. In the illustrated example, the functions are as follows. Note that the following refers to each button BT0 by the text applied to each button BT0. The same applies to other buttons described later.

"Copy" is for setup and/or execution of a function (copy function) that uses the printer 25 to print an image read by the scanner 27. "Print" is for setup of a function that uses the printer 25 to print on the basis of a print job from external equipment (for example, the terminal 21; the same applies hereinafter in this paragraph). "Scan" is for setup and/or execution related to a function that saves an image read by the scanner 27 as data in the auxiliary storage device 43 (or external equipment). "FAX" is for setup and/or execution related to facsimile (fax). Note that this function uses the scanner 27 to read an image and the printer 25 to print a received image. "Email" is for setup and/or execution related to electronic mail. This function may use the printer 25 to print some or all of the content of a received email, and may also include the data of an image read by the scanner 27 in an email to be transmitted. "Document Box" is for setup and/or execution related to a function for viewing information about print jobs or image data saved in the auxiliary storage device 43 (or external equipment). "Device Setup" is for setup related to operations common to the various functions above, such as the brightness of the display 35 and the volume of a speaker (not illustrated). "VPN" is for setup and/or execution of a VPN connection.

The screen SC1 displayed when "Copy" is touched has a plurality of buttons BT1 (software keys). Any tasks may be assigned to the plurality of buttons BT1. In the illustrated example, the tasks are as follows.

The user can touch "Paper Selection", "Reduce/Enlarge", "Density", or "Page Collation" to specify detailed settings for each of these categories. That is, the user can perform "setup" operations related to the printer 25 and the scanner 27 on the screen SC1. Touching "Execute" on the screen SC1 executes the copy function. That is, the user can perform an "execution" operation related to the printer 25 and the scanner 27 on the screen SC1. The user can touch "Cancel" to go back to the screen SC0.

In the illustrated example, the current setting is indicated at the bottom inside each button BT1. By touching a button BT1, the screen displayed on the touch panel changes further to a screen (not illustrated) corresponding to the touched setup category. Setup is performed by touching a button on the screen after the change.

Figure 14:
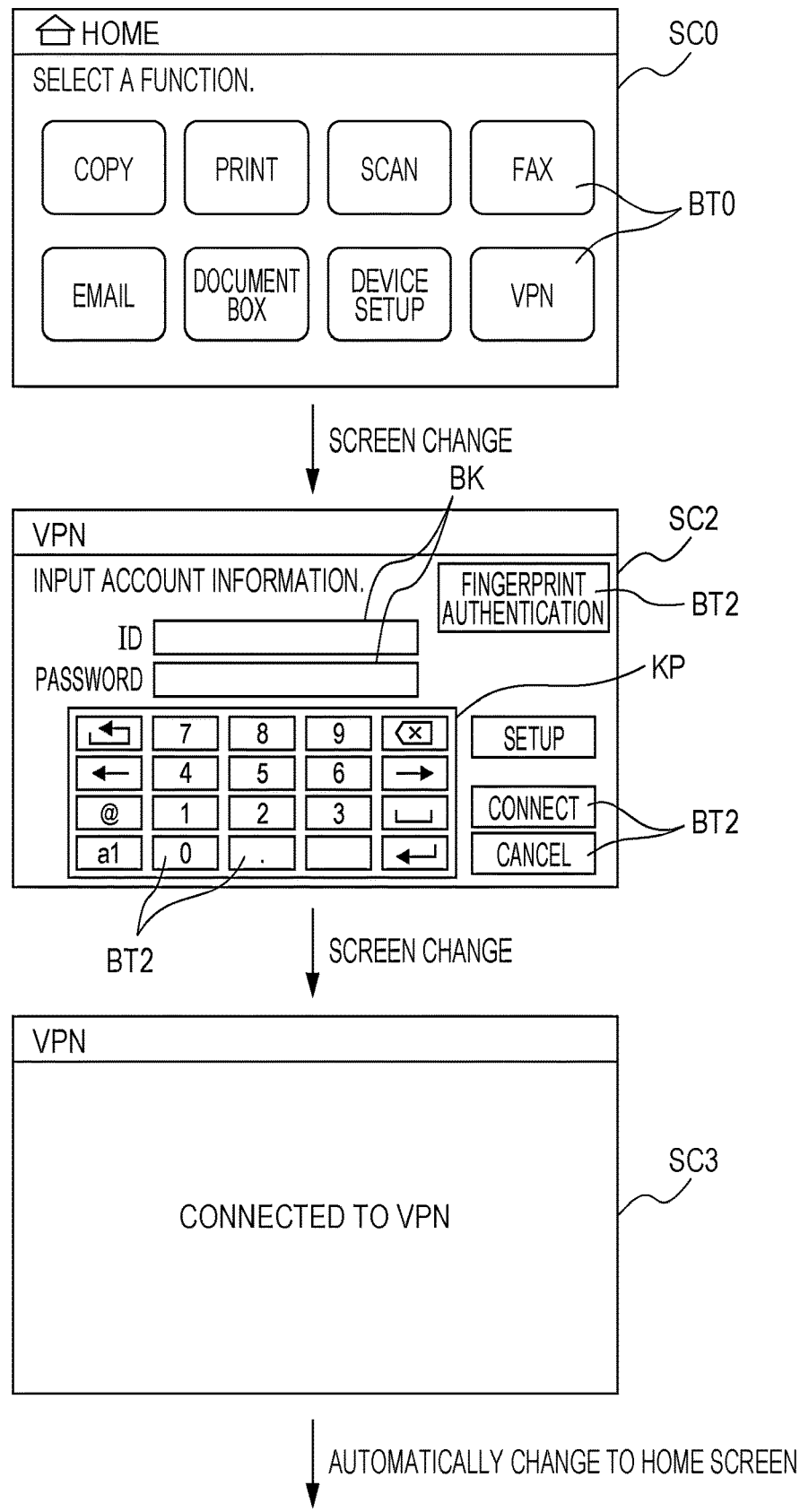
FIG. 14 is a diagram illustrating an example of screens when connecting to a VPN.

A screen SC0 illustrated at the top of FIG. 14 is the same as the screen SC0 illustrated at the top of FIG. 13. If "VPN" is touched on this screen, the screen displayed on the touch panel changes to a screen SC2 for instructing the image processing device 1 to set up and/or execute a VPN, as illustrated in the middle of FIG. 14. If an operation related to a VPN connection is performed on the screen SC2 and a VPN connection is established, the screen displayed on the touch panel changes to a screen SC3 indicating the same, as illustrated at the bottom of FIG. 14, and then returns to the screen SC0.

The screen SC2 has a plurality of blank fields BK and a plurality of buttons BT2 (software keys). Any tasks may be assigned thereto. In the illustrated example, the tasks are as follows.

As mentioned in the description of steps ST3 and ST4 of FIG. 5, the user can establish a VPN connection by inputting appropriate information into the blank fields BK corresponding to ID and password, respectively, and then touching "Connect". Information is inputted into the blank fields BK by operating a keypad KP obtained by arranging a plurality of the buttons BT2. In this way, the user can perform an "execution" operation related to a VPN connection on the screen SC2. The user can perform "setup" related to a VPN connection by touching "Setup" on the screen SC2. For example, as described above, the connection destination (VPN server or VPN) may be set in an aspect in which the connection destination is selectable. The user can touch "Fingerprint Authentication" to switch the authentication method from authentication by account information to fingerprint authentication. The authentication method may be considered a type of "setup" related to a VPN. The user can touch "Cancel" to go back to the screen SC0.

In this way, the UI unit subjected by an input action by the user may accept the input of an operation related to the printer 25 and/or the scanner 27 (FIG. 13) and acquire the authentication information D2 (FIG. 14). In this case, for example, the user can perform setup and/or execution related to the printer 25 and the scanner 27 and acquisition of the authentication information D2 (as well as setup and/or execution related to a VPN connection) with a single UI unit, and thereby enjoy improved ease of use.

Note that FIGS. 13 and 14 are merely examples, and a variety of variations are possible. For example, the plurality of buttons BT0 on the screen SC0 serving as the home screen may include a button for executing a predetermined function without changing to another screen. On the screen SC1 or SC2 after the change, the buttons BT1 or BT2 for setup are changing to yet another screen (not illustrated), but may also accept settings without requiring such a screen change. The home screen and the screens after the change are expressed as though displayed on the entire touch panel screen, but the home screen (image) and/or screens (images) after the change may also be displayed in only a portion of the touch panel screen. The screens after the change may also be like windows which are superimposed onto a portion of the home screen when opened.

The description of step ST1 of FIG. 5 indicates that the VPN software D1 may be launched by performing a predetermined operation on the operation unit 33. When such an aspect is combined with the examples of the screens in FIGS. 13 and 14, touching "VPN" on the screen SC0 may be considered an example of the predetermined operation. Obviously, the VPN software D1 may also be launched before the screen SC0 is displayed or in parallel with the process of displaying the screen SC0.

The description of step ST31 of FIG. 11 indicates that information related to the second query about whether to connect to a VPN may be displayed on the display 35. The display of "VPN" on the screen SC0 may be considered an example of the display of information related to the second query. The process in FIG. 11 is described as being performed after the VPN software D1 is launched in step ST2 of FIG. 5, and steps ST31 to ST33 and the like are described as being performed by the communication processing unit 57b. However, if "VPN" on the screen SC0 is considered to be information related to the second query as above, the display of "VPN" (or, from a different perspective, steps ST31 to ST33 and the like) may be performed before the VPN software D1 is launched, and may be performed by the OS unit 53. Note that, although not illustrated in particular, the display of information related to the second query is not limited to a display (for example, "VPN" on the screen SC0) in which a response to the second query is optional, but also a display in which a response is mandatory. The latter may involve, for example, displaying a window on top asking "Connect to VPN?" when the image processing device 1 is powered on or when the image processing device 1 is instructed to execute a specific function, and disallowing other operations unless a response is given.

Unlike the above description, the display of "Connect" on the screen SC2 may also be considered an example of the display of information related to the second query about whether to connect to a VPN. The description of FIG. 11 indicates that if input affirming the second query is given (if the determination is positive in step ST33), information related to the connection destination may be displayed on the display 35 (steps ST34 and ST35). As above, in an aspect in which "Connect" on the screen SC2 is an example of information related to the second query and steps ST34 and ST35 of FIG. 11 are executed, the screen displayed on the touch panel may change to a screen displaying information related to the connection destination when "Connect" is touched, for example. After steps ST34 and ST35 are performed, the screen displayed on the touch panel may change to the screen SC3. Note that such a screen displaying information related to the connection destination may also be displayed only if the user has not set a connection destination by touching "Setup" or only in an aspect in which the connection destination is not a category that the user can set up by touching "Setup".

(Example of Display on UI Unit: Example of Screen while Connected to VPN)

The UI unit may include a touch panel (or, from a different perspective, the display 35), as described above. In this case, when a connection to a VPN is active, the image processing device 1 (controller 31) may display information indicating the same on the UI unit. In one example, the indication of an active VPN connection on the UI unit reduces the possibility that the user will perform an input action for connecting to a VPN on the UI unit without realizing that a VPN connection is active. In another example, this indication reduces the possibility that the user will forget to disconnect from the VPN before leaving the image processing device 1. That is, user convenience is improved. The following gives examples of screens when an indication of an active connection to a VPN is displayed on the touch panel included in the UI unit.

Figure 15:
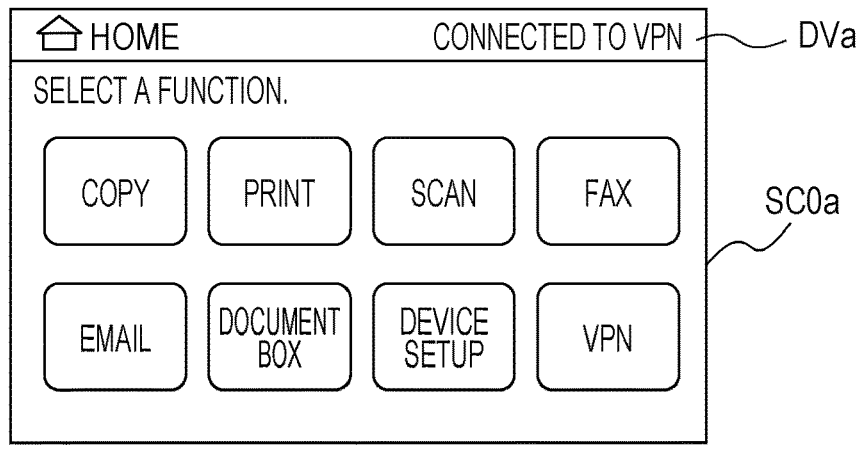
FIG. 15 is a diagram illustrating an example of a screen when connected to a VPN.

A screen SC0a illustrated as an example in FIG. 15 is displayed by the touch panel that displays the screen SC0 illustrated in FIGS. 13 and 14, and is a home screen like the screen SC0. In the present variation, the screen SC0 illustrated in FIGS. 13 and 14 is displayed when no VPN connection is active. The screen SC0a illustrated in FIG. 15 is displayed when a VPN connection is active. As understood from a comparison of the screens SC0 and SC0a, on the screen SC0a, an active VPN connection is indicated by the text DVa that states "Connected to VPN".

Figure 16:
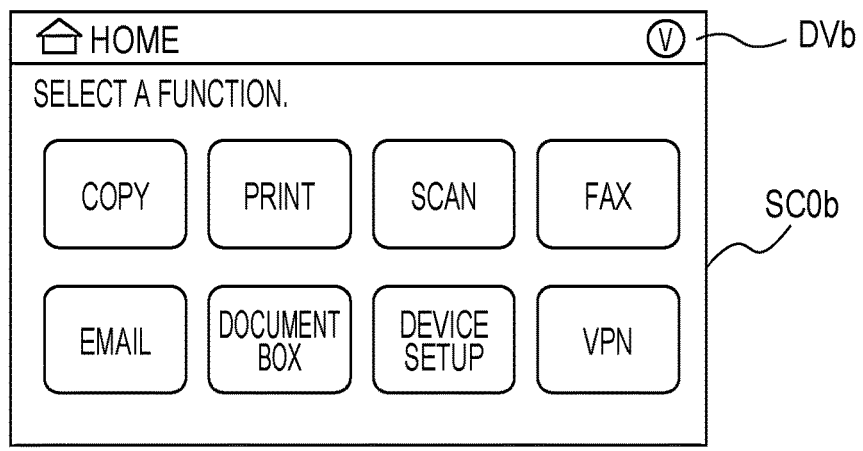
FIG. 16 is a diagram illustrating another example of a screen when connected to a VPN.

A screen SC0b illustrated as an example in FIG. 16 is a variation of the screen SC0a. On the screen SC0b, an active VPN connection is indicated by an icon DVb instead of the text Dva. Note that the text DVa and the icon DVb may also be combined.

(Restricted Functionality while Connected to VPN)

Certain functions (the execution and/or setup thereof) may also be restricted while the image processing device 1 (controller 31) is connected to a VPN. Such restriction contributes to enhanced security, for example. The functions to be restricted may be functions associated with the printer 25 and/or the scanner 27, and other functions.

The image processing device 1 (controller 31) may also change the display on the display 35 according to whether certain functions are restricted (because of an active VPN connection, for example). In other words, the display on the display 35 may indicate that certain functions are restricted (or unrestricted). The display 35 showing such a display may constitute a touch panel (may be part of the UI unit).

The following gives examples of screens displayed on the touch panel as the UI unit in an aspect in which certain functions are restricted because of an active VPN connection and in which the screen changes depending on the presence or absence of the restriction.

Figure 17:
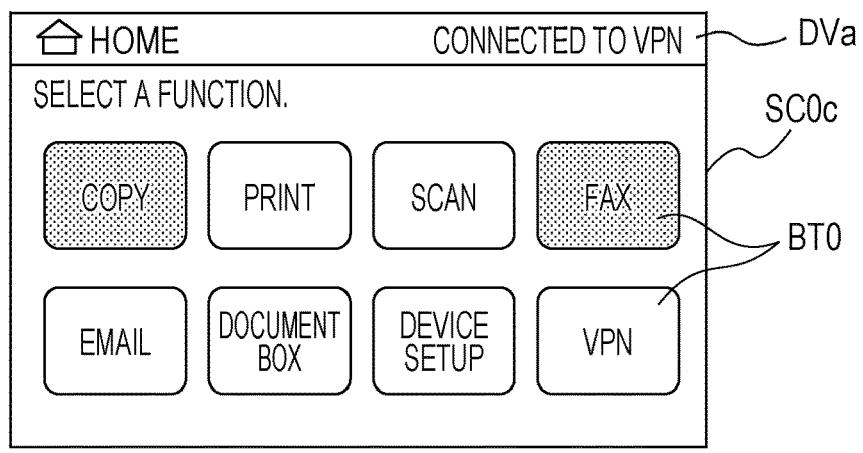
FIG. 17 is a diagram illustrating an example of a screen when functionality is restricted.

A screen SC0c illustrated in FIG. 17 is a variation of the screen SC0a illustrated in FIG. 15. That is, the screen SC0c, like the screen SC0a, is an example of a home screen when a VPN connection is active. Compared to the home screen when no VPN connection is active, that is, the screen SC0 (top of FIG. 14), the appearance of "Copy" and "FAX" are different on the screen SC0c. Specifically, "Copy" and "FAX" are grayed out on the screen SC0c. From a different perspective, "Copy" and "FAX" are displayed in a different manner (for example, brightness and/or another attribute) from the buttons BT2 for unrestricted functions. The execution (and setup) of copy and fax are also restricted.

Appropriate control for restricting functionality may be implemented. For example, the controller 31 does not execute a process for detecting touch on "Copy" and "FAX" when a VPN connection is active. The controller 31 may detect touch on "Copy" and "FAX" but not perform a process (for example, a screen change like the example illustrated in FIG. 13) in response to detected touch when a VPN connection is active.

A screen SC0d illustrated in FIG. 18 is a variation of the screen SC0c illustrated in FIG. 17. On the screen SC0d, the text "Unavailable" is displayed inside the buttons BT0 for "Copy" and "FAX" to indicate that the functions corresponding to these buttons BT0 are restricted. Note that, like the screen SC0c, the screen SC0d may be considered an example of displaying "Copy" and "FAX" in a different manner from the screen SC0.

FIG. 19 illustrates screens according to yet another example. A screen SC0a at the top of FIG. 19 is the same as the screen SC0a serving as the home screen illustrated in FIG. 15. If a button BT0 corresponding to a restricted function is touched, the screen displayed on the touch panel changes to a screen SC4 at the bottom of FIG. 19. The diagram illustrates an example in which "FAX" is touched. The screen SC4 is different from the screen that appears when the function is not restricted, and contains information (in the illustrated example, a character string) indicating that the function is restricted.

As understood from FIGS. 17 to 19, the variation of the screen in accordance with restricted functionality may be a variation of the screen for selecting a function (for example, a variation of software keys) or a variation of the screen after a function is selected. The examples in FIGS. 17 and 18 display both an indication (the text DVa) of an active VPN connection and an indication related to restricted functionality, and therefore may also be considered to be screens indicating the reason for the restricted functionality. Note that the example (screen SC4) in FIG. 19 explicitly states the reason for the restricted functionality.

FIGS. 17 to 19 may also be combined appropriately. For example, the grayed-out display in FIG. 17 may be combined with the text display in FIG. 18. An indication of restricted functionality may also be displayed like in FIG. 19 when "Copy" or "FAX" is touched on the home screen in FIG. 17 and/or FIG. 18. The notification of restricted functionality when "Copy" or "FAX" is touched may also be achieved with sound (for example, a voice explaining that functionality is restricted). In FIGS. 17 to 19, the active VPN connection is indicated by the text DVa, but may also be indicated by the icon DVb (FIG. 16) instead of, or in addition to, the text DVa.

As above, the UI unit subjected to an input action by the user for connecting to a VPN may display information related to whether or not specific functionality is restricted due to an active VPN connection. In one example, the display of information in this case reduces the possibility that the user will perform an instruction operation for execution and/or setup related to a restricted function while a VPN connection is active. That is, user convenience is improved. In another example, because of the need to disconnect from the VPN to execute and/or set up a restricted function, this display of information reduces the possibility that a VPN connection will continue unnecessarily.

Note that the specifics of the restricted functionality may differ depending on whether the image processing device 1 is connected to or disconnected from a VPN. For example, some or all of the "FAX" functionality may be restricted while connected to a VPN. On the other hand, some or all of the "Print" functionality may be restricted while disconnected from a VPN. The specifics of the restricted functionality are displayed on the UI unit to notify the user continuously or every time an input action by the user is detected. The functionality to be restricted is not limited to the examples described above and may be functionality related to the printer 25 and/or the scanner 27. In this case, the UI unit displays information related to the restricted functionality of the printer 25 and/or the scanner 27.

(Variation of UI Unit)

As described above, the UI unit subjected to an input action by the user may be any of various types of input components, such as the input/output unit 29 (or, from a different perspective, the operation unit 33), the card reader 75, or a biometric authentication sensor, for example. A combination of various input components may also be considered to be the UI unit.

Figure 20:
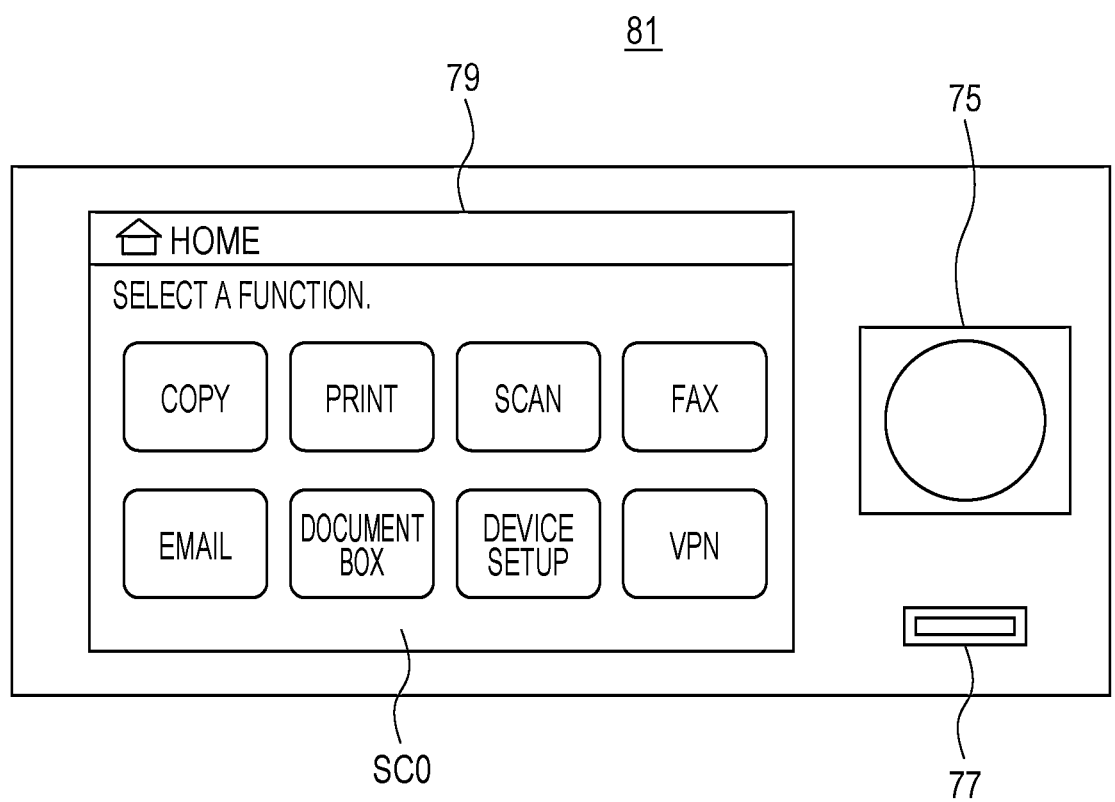
FIG. 20 is a diagram illustrating a variation of a UI unit.

FIG. 20 is a diagram illustrating an example of a UI unit 81 including two or more input components. More specifically, FIG. 20 is a plan view of the UI unit 81 as though viewing a touch panel 79 in a plan view.

The UI unit 81 includes a touch panel 79, a card reader 75, and a fingerprint sensor 77 (one example of a biometric authentication sensor). These components are arranged adjacently to form a single operation panel, for example. In other words, these components are exposed together on the near side of the plane of the page in a predetermined area of the image processing device 1. However, these components may also be disposed relatively apart from each other on the image processing device 1. As mentioned above, each of these components may be considered to be the UI unit.

The touch panel 79 can display the screens described with reference to FIGS. 13 to 19, for example. In FIG. 20, the screen SC0 in FIG. 13 (albeit simplified out of convenience in illustration) is displayed on the touch panel 79.

The card reader 75 reads information stored in a card (for example, an IC card or a magnetic card), not illustrated, which is placed to face the card reader 75 from the near side of the plane of the page. Note that the card may face the card reader 75 in a contacting or non-contacting manner. The information stored in the card is used to authenticate an individual user or a user group, for example. The read information may be used as the authentication information D2 for connecting to a VPN and/or as authentication information for disabling a restriction (a restriction imposed on each user or user group rather than because of an active VPN connection) on the functionality of the printer 25 and/or scanner 27.

The fingerprint sensor 77 acquires fingerprint information in a line-shaped or strip-shaped area extending horizontally in the diagram. The fingerprint sensor 77 scans a finger slid over the fingerprint sensor 77 upward or downward in the diagram, and obtains fingerprint information two-dimensionally. Obviously, the fingerprint sensor 77 may also not require sliding of the finger for scanning, unlike the illustrated example. The fingerprint information acquired by the fingerprint sensor 77 is typically a fingerprint image captured optically. The acquired fingerprint information (biometric information) may be used as the authentication information D2 for connecting to a VPN and/or as authentication information for disabling a restriction (a restriction imposed on each user or user group rather than because of an active VPN connection) on the functionality of the printer 25 and/or scanner 27.

As indicated by the button BT2 ("Fingerprint Authentication") for switching the authentication method on the screen SC2 illustrated in the middle of FIG. 14, two or more input components, such as the touch panel 79, the card reader 75, and the fingerprint sensor 77, may be used selectively to authenticate a VPN connection. The UI unit 81 may also include an input component which is deemed unavailable for authenticating a VPN connection. For example, the card reader 75 may be available for authentication as a prerequisite for displaying the screen SC0 serving as the home screen (in other words, authentication to determine the availability of the image processing device 1 itself, but unavailable for a VPN connection.

As above, the UI unit 81 can include two or more input components and thereby provide two or more types of authentication methods to the user in relation to a VPN connection, for example. As a result, in one example, multi-factor authentication can be used to enhance security. In another example, when some kind of trouble occurs with one type of authentication method, a VPN connection can be established with another authentication method, thereby improving user convenience.

(Turning on Indicator Light)

The above describes an aspect in which an active VPN connection is indicated by the display 35, which is capable of displaying an image (or, from a different perspective, text and/or graphics). Instead of, or in addition to, such a display, an active VPN connection may also be indicated by turning on the indicator light 35a. Note that turning on may be interpreted broadly in any of various ways that allow the user to recognize that a VPN connection is active. For example, in the above period, the indicator light 35a may be continuously on, blink on a fixed cycle, or basically be continuously on and blink when data is being transmitted or received. Outside the above period, the indicator light 35a may be continuously off, or basically be continuously off and turn on or blink when an error occurs.

(Updating VPN Software)

As described above, the update processing unit 57a updates the VPN software D1. The update is applied to the portion of the VPN software D1 which is stored in the auxiliary storage device 43 and which relates to the construction of the communication processing unit 57b (also referred to as the main portion hereinafter), for example. The update may involve rewriting some of the main portion, rewriting all of the main portion, or adding a program or data to the main portion, for example. The update may be a bug fix or an algorithm change to enhance security, for example.

The updated may be applied automatically or when an instruction is given by an operation on the operation unit 33. Information to be used in the update may be downloaded over the public network 11 or obtained from the storage medium 49 (for example, a Compact Disc (CD)). The information to be used in the update may including some or all of the rewritten part of the main portion, a portion to be added to the main portion, or information describing these portions. The rewritten portion and the portion to be added are, in other words, a patch file containing the differences before and after the update.

Figure 6:
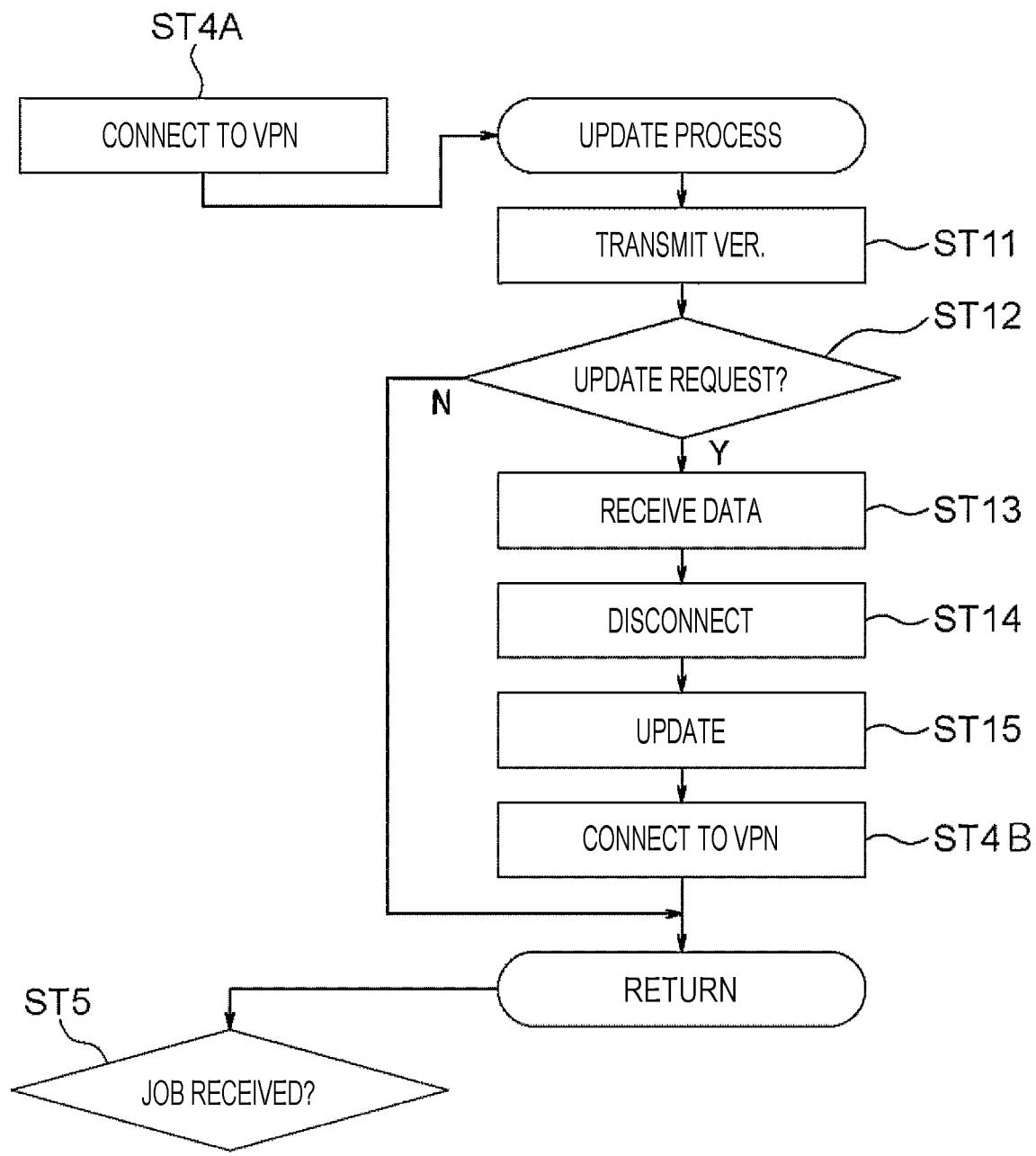
FIG. 6 is a flowchart illustrating an example procedure of an update-related process executed by a controller of an image processing device according to an embodiment.

FIG. 6 is a flowchart illustrating an example procedure of an update-related process. FIG. 6 takes the example of an aspect in which the updated is applied automatically and the information to be used in the update is downloaded over the public network 11.

Step ST4A corresponds to step ST4 in the main process of FIG. 5, for example. When a VPN connection is established in the main process, the controller 31 (VPN processing unit 57) causes the CPU 37 to execute a program (the update process illustrated in FIG. 6) corresponding to the update processing unit 57a (construct the update processing unit 57a).

In step ST11, the controller 31 (update processing unit 57a) transmits information about the current version of the VPN software D1 (more precisely, the main portion thereof) to an update server. The transmission at this time is performed by communication using a VPN, for example. The update server may be the VPN server 13A or 13B, or another server that communicates with the image processing device 1 through these VPN servers.

Although not illustrated in particular, the update server receiving the version information transmitted in step ST11 determines whether the received version information corresponds to the latest version of the VPN software D1. If the determination is positive, the update server transmits information indicating that an update is not required to the image processing device 1 from which the version information originated. If the determination is negative, the update server transmits information requesting an update to the image processing device 1 from which the version information originated. The above information is transmitted using a VPN, for example.

In step ST12, the controller 31 (update processing unit 57a) determines whether the received information is an update request. If the determination is positive, the controller 31 proceeds to step ST13. If the determination is negative, the controller 31 skips steps ST13 to ST15 and step ST4B, ends the update process, and returns to the main process (here represented by step ST5 thereof).

In step ST13, the controller 31 (update processing unit 57a) downloads information to be used in the update from the update server. The download is performed by communication using a VPN, for example.

In step ST14, the controller 31 (communication processing unit 57b) disconnects from the VPN. This process is the same and/or similar to the process in step ST8 of FIG. 5. The controller 31 (VPN processing unit 57) also terminates execution of the main portion of the VPN software D1 by the CPU 37.

In step ST15, the controller 31 (update processing unit 57a) updates the VPN software D1 on the basis of the data downloaded in step ST13.

In step ST4B, the controller 31 (VPN processing unit 57) causes the CPU 37 to execute the updated main portion (construct the communication processing unit 57b). The controller 31 (communication processing unit 57b) also connects to a VPN. Thus, a VPN connection is established on the basis of the updated VPN software D1.

The controller 31 ends the update process and returns to the main process. Note that, as understood from the above description, if no update is applied, step ST4 of FIG. 5 is the same as step ST4A of FIG. 6. If no update is applied, step ST4B is step ST4 to the process from step ST5 of FIG. 5.

(Variation of Update)

The above procedure may be changed as appropriate. Examples are given below.

In the example in FIG. 6, the update server determines whether an update is required. However, the controller 31 (update processing unit 57a) may request the update server to transmit the latest version information, and determine whether an update is required on the basis of the received latest version information.

The transmission (or reception) of version information and/or the downloading of information to be used in an update may also be performed by communication not using a VPN. The communication not using a VPN may be performed before a VPN connection is established or while a VPN connection is active.

Specifically, in one example, the transmission (or reception) of version information may be performed by communication not using a VPN. In this case, the version information may be transmitted (or received) by activating the update processing unit 57a without activating the communication processing unit 57b in step ST2, for example. If an update is required, a process may be performed to alert the user to update (to connect to a VPN to download).

In another example, both the transmission (or reception) of version information and the downloading of information to be used in an update may be performed by communication not using a VPN. In this case, steps ST11 to ST15 may be performed in step ST2, for example. By not using a VPN, the update can finish early using high-speed communication, for example.

In another example, the process up to step ST12 may be performed as above (the transmission (or reception) of version information may be performed by communication using a VPN), and when the determination is positive determination in step ST12, the controller 31 may disconnect from the VPN and download without using the VPN. That is, the order of steps ST13 and ST14 may be reversed. By not using a VPN, the download can finish early using high-speed communication, for example.

In the example in FIG. 6, the update is forced regardless of whether the user wants to update. However, a process for querying the user about whether to update may also be performed at an appropriate timing. If the user chooses not to update, a VPN connection may or may not be disallowed (not establish a VPN connection or disconnect an already established connection). The following gives an example.

Figure 12:
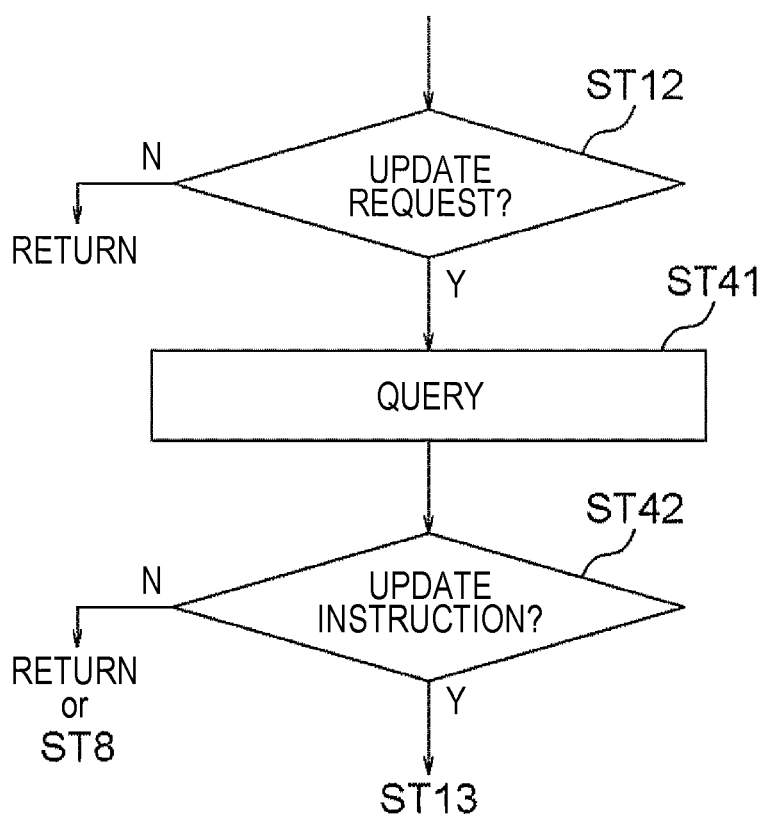
FIG. 12 is a flowchart illustrating a variation of FIG. 6.

FIG. 12 is a flowchart according to a variation, corresponding to a portion of FIG. 6. Step ST12 in the diagram is as described in FIG. 6.

In step ST41, the controller 31 (update processing unit 57a) causes the display 35 to display information (for example, an image) querying the user about whether to update the VPN software D1. The image may contain text and/or graphics. In an aspect in which the display 35 is combined with the operation unit 33 to form a touch panel, the image may contain a button or the like for accepting a user operation.

In step ST42, the controller 31 (update processing unit 57a) accepts an operation on the operation unit 33 and determines whether the accepted operation gives an update instruction. If the determination is positive, the controller 31 proceeds to step ST13. In this case, the subsequent process is the same and/or similar to the process from step ST13 of FIG. 6.

On the other hand, if the determination is negative, the controller 31 proceeds to "RETURN" in FIG. 6 and ends the update process, or proceeds to step ST8 of FIG. 5. In the former case, the VPN connection continues. In the latter case, the controller 31 disconnects from the VPN.

Note that steps ST41 and ST42 (or similar processes) may also be performed instead of, or in addition to, steps ST12 and ST13 between steps ST4A and ST11 or before step ST4A of FIG. 6, for example.

In the description above, when an update request is received (when the determination is positive in step ST12), information querying the user about whether to update is displayed (step ST41). However, the user may also be queried about whether to update at some other time. For example, a button BT2 for instructing the image processing device 1 to update may be provided on the screen SC2 in the middle of FIG. 14. The display of this button BT2 may be considered to be the display of information querying about whether to update. When the button BT2 is touched, the process of confirming whether an update is required (step ST12) may be performed, and an update (steps ST13 and ST15) may be applied if necessary. The appearance of the button BT2 for giving the instruction to update may also change on the basis of an advance confirmation of whether an update is required.

As above, the image processing device 1 may cause the display 35 to display query information (which may be referred to as information related to a first query) about whether to update the VPN software. The image processing device 1 may update the VPN software D1 if the user performs an input action on the UI unit (for example, the operation unit 33) indicating a positive response to the first query. This aspect can avoid a time-consuming update, for example, thereby improving the ease of use of the image processing device 1 to the user.

(Preliminary Operation)

As described above, the controller 31 (preliminary processing unit 55a) of the image processing device 1 may cause the printer 25 to perform a preliminary operation prior to printing. The preliminary operation may be performed for any of various purposes. For example, the preliminary operation may be performed to improve image quality and/or speed up printing. The following gives examples of preliminary operations.

Figure 7A:
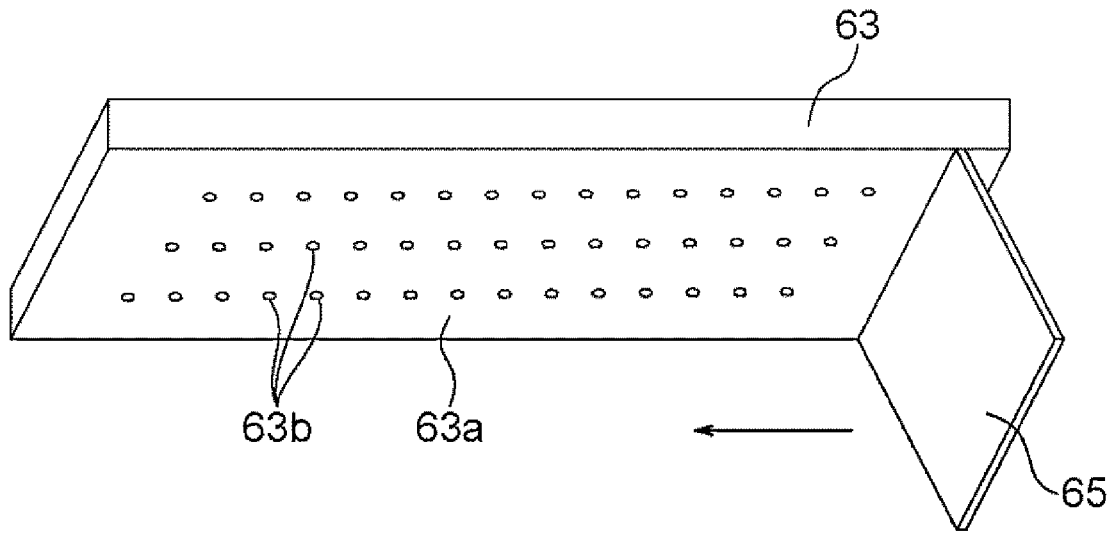
FIG. 7A is a schematic perspective view illustrating an example of a preliminary operation.

FIG. 7A is a schematic perspective view illustrating an example of a preliminary operation.

In this example, the printer 25 has an inkjet head 63. The head 63 has a facing surface 63a that faces a printing surface (for example, a paper surface). A plurality of nozzles 63b open onto the facing surface 63a. Ink (for example, a liquid) is ejected from the plurality of nozzles 63b. The preliminary operation involves nozzle cleaning for cleaning the nozzles 63b.

Nozzle cleaning may be performed in any of various ways. In the illustrated example, nozzle cleaning involves a plate sliding member 65 sliding across the facing surface 63a. A cleaning liquid may be supplied to the facing surface 63a and/or the sliding member 65 prior to sliding. Nozzle cleaning can remove foreign matter and/or dried ink adhering to the facing surface 63a. This in turn reduces the possibility that the nozzles 63b will become clogged, for example, and improves image quality.

Figure 7B:
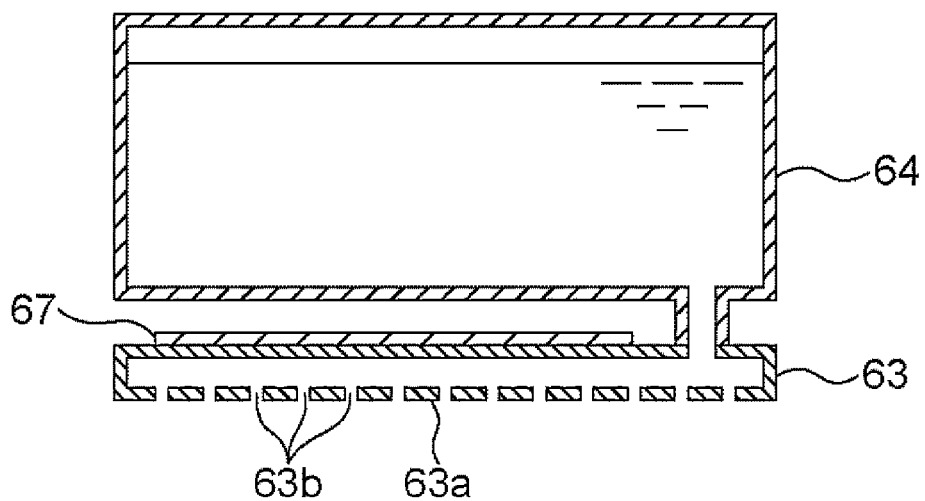
FIG. 7B is a schematic cross section illustrating another example of a preliminary operation.

FIG. 7B is a schematic cross section illustrating another example of a preliminary operation.

In this example, the printer 25 has an inkjet head 63, a tank 64 that supplies ink to the head 63, and a heater 67 that heats ink at an appropriate position. In the illustrated example, the heater 67 is located on surface of the inkjet head 63 on the opposite side from the facing surface 63a. The heater 67 heats and keeps the ink at a steady temperature, and thereby keeps ink fluidity (viscosity) constant. This in turn reduces variations in ink ejection characteristics due to ink temperature changes, and improves image quality.

Figure 7C:
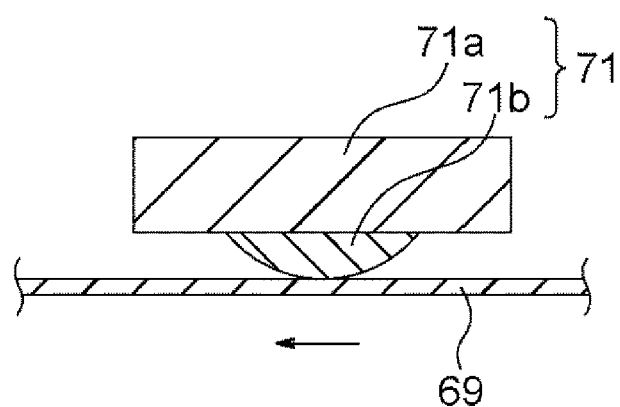
FIG. 7C is a schematic cross section illustrating yet another example of a preliminary operation.

FIG. 7C is a schematic cross section illustrating yet another example of a preliminary operation.

In this example, the printer 25 has a thermal head 71 that heats thermal paper 69 (or an ink ribbon). The head 71 has a substrate 71a and a heating unit 71b formed on the substrate 71a. The heating unit 71b slides over the thermal paper 69 while being supplied with electric power and generating heat. Thus, the thermal paper 69 is heated and printing is performed.

The preliminary operation involves supplying electric power to the heating unit 71b to preheat the heating unit 71b, for example. However, the temperature of the heating unit 71b at this time is assumed to be lower than the reaction temperature of the thermal paper (or the temperature at which ink is transferred from the ink ribbon). Performing such a preliminary operation reduces the possibility of image quality degradation due to low temperature of the heating unit 71b when printing starts immediately upon initially receiving a print job.

Note that the examples of preliminary operations illustrated in FIGS. 7B and 7C can be conceptualized more generally as operations for raising the temperature of a certain part before printing begins. The certain part is the heater 67 (or the inkjet head 63) or the heating unit 71b.

A preliminary operation like the above begins automatically after the image processing device 1 is powered on, for example. This can shorten the time from power-on to the completion of the preliminary operation, and in turn shorten the time from power-on to the start of printing.

On the other hand, as described above, the launching of the VPN software D1 (step ST2) may begin automatically after power-on. At this time, the period from the start to the completion of the preliminary operation and the period from the start to the completion of the launching of the VPN software D1 (activation of the VPN processing unit 57) may overlap at least partially. Thus, printing based on communication using a VPN can begin early after power-on, for example.

Note that the activation of the VPN processing unit 57 may be considered to begin when the CPU 37 begins reading out the VPN software D1. The activation of the VPN processing unit 57 may be considered complete when the determination of the connection condition in step ST3 is possible, for example. More specifically, for example, the activation of the VPN processing unit 57 may be considered complete when the VPN processing unit 57 is ready to accept a connection instruction from the user or at the beginning of the determination as to whether a connection using a VPN is established. If step ST3 is omitted and the establishment of a connection begins automatically, activation may be considered complete when authentication begins. In an aspect in which the example screens illustrated in FIG. 14 are adopted and the VPN software D1 is launched automatically after power-on (the VPN software D1 is not launched by touching "VPN" on the screen SC0), activation may be considered complete upon reaching state in which the authentication screen SC2 can be displayed when the user touches "VPN" the screen SC0.

FIG. 8 is a schematic timing chart for explaining a situation in which a preliminary operation like the above and activation of the VPN processing unit 57 are performed in parallel.

The horizontal direction of the chart represents time. The farther right on the chart, the longer the time elapsed. The shaded area in the upper part of the chart indicates that the controller 31 (CPU 37) is exercising control for the preliminary operation. The shaded area in the lower part of the chart indicates that the controller 31 (CPU 37) is performing operations for activating the VPN processing unit 57.

The controller 31 (preliminary processing unit 55*a*) controls the preliminary operation on a fixed control cycle T, for example. For example, every time the control cycle T elapses, the controller 31 determines the electric energy to be supplied to a motor, not illustrated, that drives the sliding member 65, to the heater 67, or to the heating unit 71*b*, and turns a switch on or off to supply power according to the determined electric energy. On the other hand, the OS unit 53 is constructed through the execution of a multi-tasking OS by the CPU, and manages processes on a predetermined cycle (time slice). The time slice is shorter than the control cycle T. The controller 31 executes a process for activating the VPN processing unit 57 while the control (process) for the preliminary operation is not underway. Thus, the preliminary operation and the activation of the VPN processing unit 57 are performed in parallel. In turn, both can be completed early.

Note that, as understood from the description above, the case in which the period from the start to the completion of the preliminary operation and the period from the start to the completion of the activation of the VPN processing unit 57 overlap at least partially does not mean that processing for both operations is performed by the CPU 37 at the same point in time (or, from a different perspective, in the same time slice). Overlap here may mean that the start and/or completion time of one operation is positioned between the start and completion times of the other operation, for example. However, processing for both operations may be performed at the same point in time by two or more CPUs, for example. FIG. 8 illustrates only processes for the preliminary operation and the activation of the VPN processing unit 57, but obviously other, additional processes may be performed in parallel.

In the illustrated example, the preliminary operation begins before the activation of the VPN processing unit 57 begins. However, the timing relationship of the two may also be the reverse of what is illustrated. In the illustrated example, the preliminary operation is completed after the activation of the VPN processing unit 57 is completed. However, the timing relationship of the two may also be the reverse of what is illustrated.

From a different perspective, the illustrated example represents an aspect in which both the preliminary operation and the activation of the VPN processing unit 57 begin automatically after the image processing device 1 is powered on, and the activation of the VPN processing unit 57 is completed before the preliminary operation is completed.

In such an aspect, the activation of the VPN processing unit 57 can be said to be completed early, for example. As a result, in one example, the receiving of a print job over a VPN can begin early. In another example, a print job can be received while the preliminary operation is underway, and printing can begin as soon as the preliminary operation is completed. Note that from the perspective of obtaining these effects, unlike the illustrated example, the periods of the preliminary operation and the activation of the VPN processing unit 57 do not necessarily overlap partially.

(Allowing and Disallowing Printing)

Rather than printing in response to print requests from all electronic devices within a VPN, the image processing device 1 may print only in response to a print request from a specific electronic device. The following gives an example.

FIG. 9A is a schematic diagram for explaining an aspect in which the image processing device 1 prints selectively.

In the diagram, tunnels Tn1 and Tn2 schematically represent virtual lines connecting two points using a VPN. The tunnel Tn1 is a virtual line connecting a terminal 21 in a home 9-1 and an image processing device 1A in the home 9-1. In actuality, the connection goes through the VPN server 13A or 13B or the like, as described with reference to FIGS. 1 and 2. The tunnel Tn2 is a virtual line connecting a terminal 21 in a home 9-2 and the image processing device 1A in the home 9-1. In actuality, the connection goes through the VPN server 13A or 13B or the like, as described with reference to FIGS. 1 and 2.

As the drawing illustrates, for example, the image processing device 1A in the home 9-1 allows printing in response to a print request from the terminal 21 in the home 9-1, but disallows printing in response to a print request from any other electronic device (in the illustrated example, the terminal 21 in the home 9-2) within the VPN. This reduces the possibility of a situation where the image processing device 1A in the home 9-1 starts printing suddenly and confuses the user in the home 9-1, for example.

Examples of electronic devices disallowed to print include an electronic device (for example, the terminal 21) located in a home 9 (here, the home 9-2) other than the home 9 (here, the home 9-1) where the image processing device 1 in question is located, and an electronic device (for example, the in-house equipment 17) in the company 5. If another electronic device (for example, another terminal 21) other than the terminal 21 is located in the home 9 where the image processing device 1 is located, printing based on a print request from the other electronic device may also be allowed or disallowed.

Note that an image processing device 1A in the home 9-2 obviously may operate in the same and/or similar manner. Not only the image processing device 1A but also an image processing device 1B may operate in the same and/or similar manner. Conversely, the image processing device 1 in the home 9-1 may allow printing in response to a print request from an electronic device other than the terminal 21 in the home 9-1 within the VPN. In this case, the user can use the image processing device 1 in the home 9-1 like a device for receiving a fax or an email.

(Specific Examples of Operations for Allowing and Disallowing Printing)

Operations like the above may be implemented appropriately. The following gives several examples.

First Example

Although not illustrated in particular, the VPN server 13A or 13B may allow communication using a VPN between the image processing device 1 in the home 9-1 and the terminal 21 in the home 9-1, and disallow communication between the image processing device 1 in the home 9-1 and an electronic device within the VPN other than the terminal 21 in the home 9-1. That is, an electronic device within the VPN other than the terminal 21 in the home 9-1 may itself be disallowed to transmit a print request to the image processing device 1 in the home 9-1.

For example, the VPN server 13A or 13B may have a table associating identification information of electronic devices (the terminal 21 in the home 9-1 and the image processing device 1 in the home 9-1) allowed to communicate with each other through a VPN. The VPN servers 13A and 13B may refer to the table to allow and disallow communication like the above. The identification information may be, for example, MAC addresses or static, private IP addresses (which may be different from the private IP addresses on the private network in the home 9-1) assigned to the terminal 21 in the home 9-1 and the image processing device 1 in the home 9-1 manually or by a VPN server.

Second Example

The image processing device 1 in the home 9-1 may operate to print if the source of the print request is a preregistered electronic device (the terminal 21 in the home 9-1) and not print otherwise.

Specifically, for example, the identification information of one or more electronic devices (here, the terminal 21 in the home 9-1) allowed to print is stored in advance in a non-volatile memory controlled by the image processing device 1 in the home 9-1. The image processing device 1 (determination unit 61) in the home 9-1, upon receiving a print request through a VPN, acquires the identification information of the source of the print request through the VPN and determines whether the acquired identification information matches the identification information of any of the one or more electronic devices stored in advance. The image processing device 1 (print processing unit 55*b*) in the home 9-1 prints according to the print request if a match is determined, and does not print if no match is determined.

The non-volatile memory is the auxiliary storage device 43 or the storage medium 49, for example. The identification information may be, for example, a MAC address or a static, private IP address (which may be different from the private IP address on the private network in the home 9-1) assigned to the terminal 21 in the home 9-1 manually or by a VPN server. Identification information may be acquired through the VPN as appropriate. For example, identification information of the source may be included in a header or the like of a packet containing the print request and used. The identification information included in a packet may be included in a packet generated in the terminal 21, or embedded in the packet when the VPN server 13A or 13B forwards the packet from the terminal 21. Note that in the former case, FIG. 9A may be considered to illustrate a situation in which identification information for discrimination is transmitted to the image processing device 1 in the home 9-1.

Third Example

The image processing device 1 (determination unit 61) in the home 9-1 may also determine whether itself and the source of a print request belong to the same LAN, on the basis of communication that does not establish a connection. The image processing device 1 (print processing unit 55*b*) in the home 9-1 may operate to print when itself and the source of the print request are determined to belong to the same LAN, and not print when the two are determined not to belong to the same LAN.

FIG. 9B is a schematic diagram illustrating an example of communication that does not establish a connection.

In this example, the image processing device 1A in the home 9-1 acquires information on a private IP address and/or MAC address (hereinafter simply referred to as an address in this paragraph) of the source of a received packet containing a print request. The image processing device 1A (general communication processing unit 59) in the home 9-1 broadcasts over a LAN formed through connections to the router 19 in the home 9-1 (arrow y1). That is, the image processing device 1A in the home 9-1 transmits data to all electronic devices, other than the image processing device 1A, connected to the router 19 in the home 9-1. The data includes information on the address acquired from the packet of the print request and information requesting a reply to the image processing device 1A if an electronic device has that address. The one or more electronic devices (however, no electronic devices may be present in some cases) receiving the data reply (arrow y2) if an electronic device has the address included in the received data, and do not reply if not. The image processing device 1A (determination unit 61) in the home 9-1 prints according to the print request upon receiving a reply, and does not print upon receiving no reply.

Besides the above, although not illustrated in particular, the image processing device 1 may acquire, from the data of the received print request, information about the source for short-range wireless communication with the source, and use the information to test whether short-range wireless communication (that does not establish a connection) is possible with the source, for example. Note that this determination may be considered a determination of whether the terminal 21 and the image processing device 1 belong to the same LAN. Since short-range wireless communication is limited in distance, the determination may also be considered a determination of whether the terminal 21 and the image processing device 1 satisfy a prescribed positional relationship.

Fourth Example

As mentioned above, the image processing device 1 (determination unit 61) in the home 9-1 may operate to print if itself and the source of a print request satisfy a prescribed positional relationship, and not print otherwise. An example is given below.

FIG. 9C is a schematic diagram illustrating an example aspect in which printing is performed when the image processing device 1 and the terminal 21 satisfy a prescribed positional relationship.

In this example, the image processing device 1 and the terminal 21 have measurement units 1*p* and 21*p*, respectively, that identify a localized position using a satellite positioning system. The satellite positioning system is the Global Positioning System (GPS), for example.

When transmitting a print request through a VPN (tunnel Tn3), the terminal 21 also transmits, through the VPN, current localized position information identified by the measurement unit 21*p*. Note that the print request and the position information may be included in the same packet or in different packets (one may be transmitted before or after the other). The terminal 21, having transmitted a print request, may also receive a request for position information from the image processing device 1 and transmit position information in response to the request. That is, the terminal 21 may transmit position information only upon request, and not transmit position information automatically.

As understood from the above, when the image processing device 1 receives a print request, the image processing device 1 acquires position information about the source, either automatically or by requesting position information from the source. The image processing device 1 (determination unit 61) determines whether the relationship between the acquired position of the source and the current localized position identified by the measurement unit 1*p* satisfies a prescribed condition. For example, the image processing device 1 determines whether the distance between the two is within a prescribed range (for example, approximately the size of a building). The image processing device 1 (print processing unit 55*b*) prints according to the print request when the prescribed condition is determined to be satisfied, and does not print otherwise.

(Procedure of Allowing and Disallowing Printing)

Figure 10:
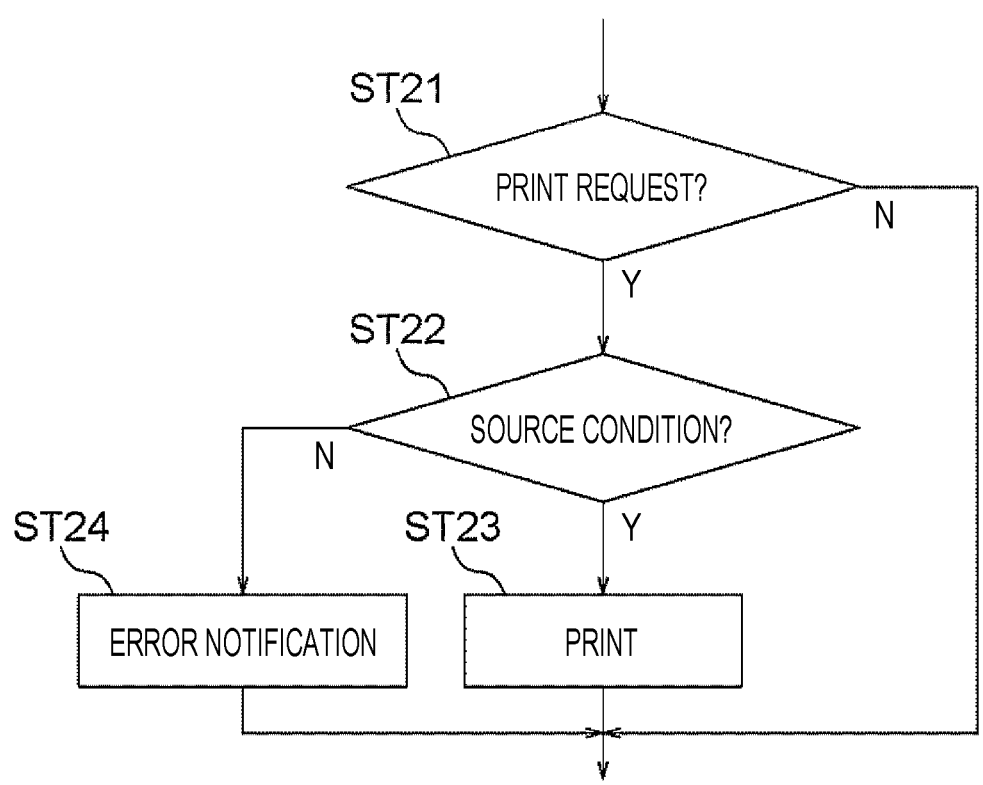
FIG. 10 is a flowchart illustrating an example procedure of a process executed by a controller in an aspect in which an image processing device prints selectively.

FIG. 10 is a flowchart illustrating an example procedure of a process executed by the controller 31 of the image processing device 1 in an aspect in which the image processing device 1 prints selectively, like in the second to fourth examples above. This process corresponds to steps ST5 and ST6 of FIG. 5.

In step ST21, the controller 31 determines whether a print request is received through a VPN. This determination, like step ST5 of FIG. 5, may determine whether a print job is received. That is, a print request may be the same as a print job, and step ST21 may be the same as step ST5. This determination may also be a determination of whether data is received, the data being transmitted prior to the transmission of image data included in a print job. That is, a print request may be a portion of a print job, and step ST21 may be a portion of step ST5. Such print request data may be, for example, data for negotiation (for example, data giving notice of the size and number of packets) prior to transmitting image data.

If the determination is positive, the controller 31 proceeds to step ST22. If the determination is negative, the controller 31 skips steps ST22 to ST24. In skipping these steps, the controller 31 proceeds to step ST7 in the case of FIG. 5, for example.

In step ST22, the controller 31 (determination unit 61) determines whether the source of the print request satisfies a prescribed condition. This determination may be made in any of various ways, as described with reference to FIGS. 9A to 9C. Note that two or more of the second to fourth examples may also be combined. If the determination is positive, the controller 31 proceeds to step ST23. If the determination is negative, the controller 31 proceeds to step ST24.

In step ST23, the controller 31 (print processing unit 55*b*) prints according to the print request. More specifically, for example, if the controller 31 has completed receiving the image data included in the print job in step ST21, the controller 31 prints on the basis of the image data. Note that in this case, step ST23 is the same as step ST6 of FIG. 5. In another example, if the controller 31 has not received the image data included in the print job in step ST21, the controller 31 receives the image data and prints on the basis of the received image data. Note that in this case, step ST23 includes a portion of step ST5 and step ST6 of FIG. 5.

In step ST24, the controller 31 transmits data giving notice of an error to the source of the print request through the VPN. Thus, if the print request was transmitted from the terminal 21 in the home 9-2 to the image processing device 1 in the home 9-1, for example, the terminal 21 in the home 9-2 receives the data giving notice of an error. The terminal 21 in the home 9-2 may perform a process (for example, a process of notifying a user about the error) based on the reception of the data.

In the process of step ST24, a notification may be given to the user of the image processing device 1 in the home 9-1 instead or, or in addition to, the notification to the source of the print job, namely the terminal 21 in the home 9-2. That is, in step ST24, the image processing device 1 in the home 9-1 may display, on its own display 35, information (for example, an image) indicating that a print job was received but not printed. In this case, for example, the user in the home 9-1 can learn that a print job was transmitted to the image processing device 1 even if the image processing device 1 does not print.

In step ST24, the data transmitted to the terminal 21 in the home 9-2 and/or the information displayed on the display 35 in the home 9-1 may include the reason why the print job was not printed (the reason for the negative determination in step ST22). The information displayed on the display 35 in the home 9-1 may also include information on the source of the print job. In these cases, for example, the user of the image processing device 1 in the home 9-1 can take action more easily upon learning that a print job that will not be printed was transmitted to the image processing device 1 in the home 9-1.

As above, in the present embodiment, the image processing device 1 includes the housing 23, an image processing unit (25 and/or 27), a UI unit (for example, the operation unit 33 and/or the connector 47), and the VPN processing unit 57. The image processing unit includes the printer 25 and/or the scanner 27. The UI unit is the target of an input action performed by the user. The VPN processing unit 57 uses authentication information D2 acquired through the UI unit to perform authentication for establishing a connection to a VPN, and communicates through the VPN.

Consequently, for example, the image processing device 1 can establish a VPN connection and communicate without needing to communicate with a mobile terminal to acquire the authentication information D2 from the mobile terminal. As a result, in one example, non-VPN communication with the mobile terminal is unnecessary, thereby reducing the possibility of weakened security due to such communication. In another example, the configuration has reduced need for dedicated VPN equipment interposed between the image processing device 1A and the router 19, or between the image processing device 1B and the public network 11. As a result, the configuration is simplified in relation to the network of the image processing device 1 and nearby equipment.

The UI unit may accept the input of an operation related to the image processing unit (25 and/or 27).

In this case, as described above, for example, the user can perform setup and/or execution related to the printer 25 and the scanner 27 and acquisition of the authentication information D2 (as well as setup and/or execution related to a VPN connection) with a single UI unit (for example, the touch panel or the UI unit 81 illustrated in FIG. 20), and thereby enjoy improved ease of use.

The image processing device 1 may communicate as a client of a remote access VPN.

In this case, for example, the load on the image processing device 1 is reduced compared to an aspect (which may also be included in the technology according to the present disclosure) in which the image processing device 1 is a VPN server. From a different perspective, the hardware specifications of the image processing device 1 can be lowered. This results in a more inexpensive image processing device 1 and facilitates installation of the image processing device 1 in many homes 9, for example.

The controller 31 may include a processor (CPU 37) and a storage device (for example, the auxiliary storage device 43) storing the VPN software D1 (or at least a portion thereof). The VPN processing unit 57 may be constructed at least partially by the CPU 37 executing the VPN software D1. If the VPN software D1 is not of the latest version, the VPN processing unit 57 (update processing unit 57a) may update the VPN software D1 by downloading update data forming at least a portion of the up-to-date VPN software D1.

In this case, for example, the VPN software D1 is maintained at the latest version, and a high level of security is more easily maintained. Since the data for the update is downloaded from a server, the update can be performed more easily compared to an update performed using a storage medium.

The VPN processing unit 57 (update processing unit 57a) may download the update data through a VPN.

In this case, for example, security can be enhanced compared to an aspect (which may also be included in the technology according to the present disclosure) of downloading without going through a VPN.

The VPN processing unit 57 (update processing unit 57a) may start communication through a VPN automatically after connecting to the VPN. That is, the VPN processing unit 57 (update processing unit 57a) may start communication (steps ST11 and ST12) for identifying whether the VPN software D1 stored in a storage device (for example, the auxiliary storage device 43) is the latest version.

This case, for example, reliably provides an opportunity to check whether the version is up to date compared to an aspect (which may also be included in the technology according to the present disclosure) in which the communication for identifying whether the version is up to date is executed only on the basis of a user operation. The communication takes place through a VPN, thereby enhancing security compared to an aspect (which may also be included in the technology according to the present disclosure) in which version information is checked by non-VPN communication.

The VPN processing unit 57 may establish a connection to a VPN automatically after the image processing device 1 is powered on.

In this case, for example, a user operation for establishing a VPN connection is unnecessary. As a result, the user can use the image processing device 1 in a highly secure environment without worrying about security. That is, the image processing device 1 can have improved convenience while ensuring security.

The image processing device 1 may include an indicator light 35a that indicates an active connection to a VPN.

In this case, for example, the user can easily grasp the availability of communication through a VPN.

The controller 31 may control the printer 25 so that a preliminary operation that the printer 25 performs prior to printing begins automatically after the image processing device 1 is powered on. The controller 31 may start activating the VPN processing unit 57 (launching the VPN software D1) automatically after the image processing device 1 is powered on. The preliminary operation and the activation of the VPN processing unit 57 may be performed in at least partially overlapping periods. The preliminary operation may include an operation for cleaning nozzles 63b that eject ink and an operation for raising the temperature of a certain part (head 63 or heating unit 71b) of the printer 25, for example.

In this case, as described above, the VPN processing unit 57 (communication processing unit 57b) can be activated while the printer 25 is preparing to print, for example. As a result, a print job can be received over a VPN and printing can begin quickly.

The controller 31 may include a determination unit 61 and a print processing unit 55b. The determination unit 61 may acquire identification information of the source of a print request through a VPN and determine whether the acquired identification information matches identification information stored in advance. The print processing unit 55b may control the printer 25 to print according to the print request when the determination unit 61 finds a match, and not print according to the print request when the determination unit 61 does not find a match.

As described above, this case reduces the possibility that the user in the home 9-2 will accidentally print using the image processing device 1 in the home 9-1, for example. Since the image processing device 1 itself determines the availability of printing, a setting or the like in the VPN server 13A or 13B is unnecessary. The availability of printing is determined on the basis of identification information obtained through a VPN, thereby ensuring security. The availability of printing is determined according to whether the source is preregistered in the image processing device 1, thereby allowing a high degree of flexibility in setting the availability of printing. For example, printing can be allowed even if the source and the image processing device 1 do not belong to the same LAN or are not positioned in a prescribed relationship (within a prescribed distance of each other).

The determination unit 61 may determine whether the source of a print request and the image processing device 1 belong to the same LAN, on the basis of communication that does not establish a connection. The print processing unit 55b may control the printer 25 to print according to the print request when the determination unit 61 determines that the source of the print request and the image processing device 1 belong to the same LAN. The print processing unit 55b may control the printer 25 to not print according to the print request when the determination unit 61 determines that the source of the print request and the image processing device 1 do not belong to the same LAN.

This case, like the above case, also reduces the possibility that the user in the home 9-2 will accidentally print using the image processing device 1 in the home 9-1, for example. In another example, the availability of printing is determined on the basis of communication that does not establish a connection, and thus can be determined easily while maintaining security. For instance, as illustrated by the example in FIG. 9B, the availability of printing can be determined by information included in a packet of a print request and communication using broadcasting, without preregistering the terminal 21 that is allowed to print in the image processing device 1.

The image processing device 1 may further include a measurement unit 1p that uses a satellite positioning system to identify the position of the image processing device 1. The determination unit 61 may acquire information on the location of the source of a print request through a VPN and determine whether the relationship between the position of the source and the position of the image processing device 1 identified by the measurement unit 1p satisfies a prescribed condition. The print processing unit 55b may control the printer 25 to print according to the print request when the determination unit 61 determines that the prescribed condition is satisfied, and not print according to the print request when the determination unit 61 determines that the prescribed condition is not satisfied.

This case, like the above case, also reduces the possibility that the user in the home 9-2 will accidentally print using the image processing device 1 in the home 9-1, for example. In another example, the source and the image processing device 1 do not necessarily belong to the same LAN, thereby allowing a high degree of flexibility in the communication environment in the home 9 to which this technology can be applied.

The technology according to the present disclosure is not limited to the foregoing embodiments and may be carried out in various aspects.

For example, the image processing device is not necessarily a multi-function device including a printer and a scanner, and may also be a device with print functionality only (that is, a printer in the narrow sense) or a device with scan functionality only (that is, a scanner in the narrow sense). Note that a multi-function device may be considered a printer (in the broad sense) or a scanner (in the broad sense).

The invention claimed is:

1. An image processing device, comprising:
an image processing unit including a printer;
a user interface (UI) unit subjected to an input action performed by a user;
a virtual private network (VPN) processing unit that connects to a virtual private network (VPN) using authentication information acquired through the UI unit; and
a housing provided with the image processing unit, the UI unit, and the VPN processing unit,
wherein
the image processing device further includes a controller configured to:
receive a print request to the printer through the VPN,
acquire identification information of a source of the print request through the VPN and determine whether the acquired identification information matches identification information stored in advance, and
control the printer to:
print according to the print request when a match is determined, and
not print according to the print request when no match is determined.

2. The image processing device according to claim 1, further comprising a storage device storing virtual private network (VPN) software,
wherein if the VPN software is not of a latest version, the image processing device is configured to download update data and update the VPN software.

3. The image processing device according to claim 1, further comprising a display, wherein the image processing device is configured to display, on the display, information related to a second query about whether to connect to the VPN.

4. The image processing device according to claim 1, further comprising a display, wherein when a virtual private network (VPN) connection is active, the image processing device is configured to display information indicating the active VPN connection on the display.

5. The image processing device according to claim 1, further comprising a display, wherein when printing will not be performed, the image processing device is configured to display a reason why on the display.

6. The image processing device according to claim 1, wherein, the UI unit comprises a home screen displayed as an initial screen when the image processing device is powered on or comes out of sleep mode,
the home screen comprises a plurality of function buttons and a virtual private network (VPN) button, and
the VPN processing unit is configured to transmit the authentication information acquired through the UI unit to a virtual private network (VPN) server to connects to the VPN after the VPN button is selected.

7. An image processing device, comprising:
an image processing unit including a printer;
a user interface (UI) unit subjected to an input action performed by a user;
a virtual private network (VPN) processing unit that connects to a virtual private network (VPN) using authentication information acquired through the UI unit; and
a housing provided with the image processing unit, the UI unit, and the VPN processing unit,
wherein
the image processing device further includes a controller configured to:
receive a print request to the printer through the VPN,
determine whether a source of the print request and the image processing device belong to a same local area network (LAN), on a basis of communication that does not establish a connection, and
control the printer to:
print according to the print request when the source of the print request and the image processing device are determined to belong to the same LAN, and not print according to the print request when the source of the print request and the image processing device are determined not to belong to the same LAN.

8. The image processing device according to claim 7, further comprising a display, wherein when printing will not be performed, the image processing device is configured to display a reason why on the display.

9. The image processing device according to claim 7, wherein, the UI unit comprises a home screen displayed as an initial screen when the image processing device is powered on or comes out of sleep mode,
the home screen comprises a plurality of function buttons and a virtual private network (VPN) button, and
the VPN processing unit is configured to transmit the authentication information acquired through the UI unit to a virtual private network (VPN) server to connects to the VPN after the VPN button is selected.

10. The image processing device according to claim 7, further comprising a storage device storing virtual private network (VPN) software,
wherein if the VPN software is not of a latest version, the image processing device is configured to download update data and update the VPN software.

11. The image processing device according to claim 7, further comprising a display, wherein the image processing device is configured to display, on the display, information related to a second query about whether to connect to the VPN.

12. The image processing device according to claim 7, further comprising a display, wherein when a virtual private network (VPN) connection is active, the image processing device is configured to display information indicating the active VPN connection on the display.

13. An image processing device, comprising:
an image processing unit including a printer;
a user interface (UI) unit subjected to an input action performed by a user;
a virtual private network (VPN) processing unit that connects to a virtual private network (VPN) using authentication information acquired through the UI unit; and
a housing provided with the image processing unit, the UI unit, and the VPN processing unit,
wherein
the image processing device further includes a controller configured to:
receive a print request to the printer through the VPN,
determine whether a relationship between a position of the source of the print request and a position of the image processing device satisfies a prescribed condition, and
control the printer to:
print according to the print request when the prescribed condition is determined to be satisfied, and
not print according to the print request when the prescribed condition is determined not to be satisfied.

14. The image processing device according to claim 13, wherein the image processing device is configured to
use a satellite positioning system to identify the position of the image processing device, and
acquire information on the position of the source of the print request through the VPN.

15. The image processing device according to claim 13, further comprising a display, wherein when printing will not be performed, the image processing device is configured to display a reason why on the display.

16. The image processing device according to claim 13, wherein, the UI unit comprises a home screen displayed as an initial screen when the image processing device is powered on or comes out of sleep mode,
the home screen comprises a plurality of function buttons and a virtual private network (VPN) button, and
the VPN processing unit is configured to transmit the authentication information acquired through the UI unit to a virtual private network (VPN) server to connects to a virtual private network (VPN) after the VPN button is selected.

17. The image processing device according to claim 13, further comprising a storage device storing virtual private network (VPN) software,
wherein if the VPN software is not of a latest version, the image processing device is configured to download update data and update the VPN software.

18. The image processing device according to claim 13, further comprising a display, wherein the image processing device is configured to display, on the display, information related to a second query about whether to connect to the VPN.

19. The image processing device according to claim 13, further comprising a display, wherein when a virtual private network (VPN) connection is active, the image processing device is configured to display information indicating the active VPN connection on the display.

* * * * *